(12) United States Patent
Murai et al.

(10) Patent No.: US 8,007,184 B2
(45) Date of Patent: Aug. 30, 2011

(54) SELF-ALIGNING ROLLER BEARING WITH RETAINER AND MANUFACTURING METHOD FOR SELF-ALIGNING ROLLER BEARING RETAINER

(75) Inventors: Takashi Murai, Fujisawa (JP); Toshiyuki Tanaka, Fujisawa (JP); Masatake Ichimaru, Fujisawa (JP)

(73) Assignee: NSK Ltd., Tokyo (JP)

( * ) Notice: Subject to any disclaimer, the term of this patent is extended or adjusted under 35 U.S.C. 154(b) by 633 days.

(21) Appl. No.: 11/631,525

(22) PCT Filed: Nov. 22, 2005

(86) PCT No.: PCT/JP2005/021486
§ 371 (c)(1),
(2), (4) Date: Apr. 11, 2008

(87) PCT Pub. No.: WO2006/057258
PCT Pub. Date: Jun. 1, 2006

(65) Prior Publication Data
US 2008/0260313 A1    Oct. 23, 2008

(30) Foreign Application Priority Data

Nov. 24, 2004 (JP) ................................. 2004-339287
Mar. 14, 2005 (JP) ................................. 2005-070242
Jun. 27, 2005 (JP) ................................. 2005-185931

(51) Int. Cl.
*F16C 23/08* (2006.01)
*F16C 33/49* (2006.01)

(52) U.S. Cl. .......... 384/558; 384/450; 384/568; 384/577

(58) Field of Classification Search .................. 384/450, 384/558, 568, 572, 577, 580
See application file for complete search history.

(56) References Cited

U.S. PATENT DOCUMENTS 2,375,145 A * 5/1945 Styri .............................. 384/577
2,611,669 A * 9/1952 Palmgren ...................... 384/572
(Continued)

FOREIGN PATENT DOCUMENTS

DE            200 20 397 U1    2/2001
(Continued)

OTHER PUBLICATIONS

International Search Report dated Apr. 11, 2006 with English translation (Four (4) pages).
(Continued)

*Primary Examiner* — Thomas R Hannon
(74) *Attorney, Agent, or Firm* — Crowell & Moring LLP

(57) ABSTRACT

There is realized a self-aligning roller bearing with retainer that stabilizes the orientation of spherical rollers and prevents these spherical rollers from skewing, and which can be rotated at high speed, and furthermore which enables efficient lubricant feed into pockets 9.

By rotating a turning tool 14 as it revolves, the surfaces on both sides in the circumferential direction of respective column sections are processed into concave curved surfaces that oppose a rolling surface of the respective spherical rollers across a pocket clearance into which lubricant oil can be fed. The length of the column sections 8*c* is less than the length in the axial direction of the spherical rollers, and greater than a half of the length, and an end portion of the side surface in the circumferential direction of the respective column sections 8*c* projects further in the circumferential direction than an intermediate portion thereof, and the spherical rollers are embraced in the pockets 9.

12 Claims, 14 Drawing Sheets

U.S. PATENT DOCUMENTS

| | | | |
|---|---|---|---|
| 2,611,670 A | | 9/1952 | Palmgren |
| 3,290,102 A | * | 12/1966 | Eriksson et al. ............. 384/577 |
| 5,295,749 A | * | 3/1994 | Takahashi et al. ............ 384/568 |
| 6,955,476 B1 | * | 10/2005 | Murai ........................... 384/580 |

FOREIGN PATENT DOCUMENTS

| | | |
|---|---|---|
| JP | 51-19253 | 2/1976 |
| JP | 59-40623 U | 3/1984 |
| JP | S59-040623 | 3/1984 |
| JP | 60-201113 A | 10/1985 |
| JP | 5-245719 A | 9/1993 |
| JP | 2524932 Y2 | 11/1996 |
| JP | 9-317760 A | 12/1997 |
| JP | 2002-147464 | 5/2002 |
| JP | 2003-194067 A | 7/2003 |

OTHER PUBLICATIONS

Supplementary European Search Report dated Mar. 31, 2009 (Nine (9) pages).

PCT/IB/338, PCT/IB/373 and PCT/ISA/237 (Seven (7) pages).

Japanese Office Action dated Feb. 15, 2011 (3 pages) and English language translation (4 pages).

* cited by examiner

SELF-ALIGNING ROLLER BEARING WITH RETAINER AND MANUFACTURING METHOD FOR SELF-ALIGNING ROLLER BEARING RETAINER

TECHNICAL FIELD

A self-aligning roller bearing with retainer relating to the present invention is used for example assembled into a rotation supporting section of a roller shaft of various kinds of industrial mechanical apparatuses such as a paper manufacturing machine and a metal rolling mill, for supporting a rotation shaft inside a housing.

BACKGROUND ART

For example, for supporting a heavy shaft inside a housing so that it may rotate freely, a self-aligning roller bearing with retainer such as for example, those disclosed in Japanese Patent Application Publication No. H 09-317760 (Patent Document 1) and in Japanese Utility Model Registration No. 2524932 (Patent Document 2), has conventionally been used. FIG. 16 to FIG. 19 show a first example of the conventional construction disclosed in Patent Document 1. This self-aligning roller bearing with retainer is configured with a plurality of spherical rollers 3 arranged so as to allow them to rotate freely between an outer ring 1 and an inner ring 2, which are concentrically combined. A retainer 4 controls the orientation and position of this plurality of spherical rollers 3.

A spherical concave shaped outer raceway 5 having a single center is formed on an inner peripheral surface of the outer ring 1. Moreover, a pair of inner raceways 6, which respectively oppose the outer raceway 5, are provided on both sides in the width direction (left-right direction in FIG. 17) of an outer peripheral surface of the inner ring 2. Furthermore, the plurality of spherical rollers 3 have a symmetrical shape (beer barrel shape) the maximum diameter of which is in the middle section of the length in the axial direction of the spherical rollers 3, and this plurality of spherical rollers 3 is provided in two rows between the outer raceway 5 and the pair of the inner raceways 6, being freely rotatable in each row. Furthermore, a radius of curvature of a generatrix of the rolling surfaces of the respective spherical rollers 3 is slightly smaller than that of the generatrixes of the outer raceway 5 and the inner raceways 6.

The retainer 4 is provided with one rim section 7 and a plurality of column sections 8. The rim section 7 is annular in shape, and is arranged between both rows of spherical rollers 3. Moreover, each of these column sections 8 is disposed in the axial direction of the outer ring 1 and inner ring 2 in a state where the base end sections of the column sections 8 are respectively joined to a plurality of positions at even intervals around the circumferential direction of the surfaces on both sides in the axial direction of the rim section 7. The end section of each column section 8 is a free end that is not joined with other sections. The portion between the column sections 8 that are co-adjacent to each other in the circumferential direction is a pocket 9 for holding each of the spherical rollers 3 so that they may rotate freely. Moreover, by having an outer peripheral surface of the rim section 7 closely opposed to the inner peripheral surface of the middle section of the outer ring 1, the position of the retainer 4 in the radial direction is determined (by outer ring riding). Furthermore, flange shaped outward rib sections 10 are respectively formed on the outer peripheral surfaces of both end sections of the inner ring 2 so that the respective spherical rollers 3 do not disengage outwards in the axial direction from the space between the inner peripheral surface of the outer ring 1 and the outer peripheral surface of the inner ring 2.

According to the self-aligning roller bearing with retainer constructed as described above, in the case where, for example, a rotation shaft is to be supported inside a housing, the outer ring 1 is fitted and fixed inside the housing, and the inner ring 2 is fitted and fixed outside the rotation shaft. When the inner ring 2 rotates together with the rotation shaft, the plurality of the spherical rollers 3 roll and allow this rotation. When the shaft centers of the housing and the rotation shaft are not matched, the inner ring 2 self-aligns inside the outer ring 1 (the central axis of the inner ring 2 tilts with respect to the central axis of the outer ring 1) to compensate this mismatch. In this case, since the outer raceway 5 is formed in a single spherical shape, even after compensating the mismatch, the plurality of spherical rollers 3 roll smoothly.

In the case of the first example of the conventional construction described above, the retainer 4 for holding both rows of spherical rollers 3 is integrated. By contrast, Patent Document 2 discloses a construction in which retainers 4a for holding both rows of spherical rollers 3 are made mutually independent as shown in FIG. 20. In the case of this second example of the conventional construction too, the rib sections 10 are formed on the outer peripheral surfaces of both end sections of the inner ring 2 so that the respective spherical rollers 3 do not disengage outwards in the axial direction from the space between the inner peripheral surface of the outer ring 1 and the outer peripheral surface of the inner ring 2.

Moreover, in Patent Document 1, as shown in FIG. 21, there is disclosed a construction in which the outer peripheral surfaces of both end sections of the inner ring 2a have no rib sections as a result of connecting the end sections of the respective column sections 8a, which constitute the retainer 4b, by a connection section 11. In the case of this third example of the conventional construction, according to the engagement of the respective connection sections 11 and the end surfaces in the axial direction of the spherical rollers 3, the respective spherical rollers 3 are prevented from disengaging outwards in the axial direction from the space between the inner peripheral surface of the outer ring 1 and the outer peripheral surface of the inner ring 2.

Moreover, FIG. 22 shows a fourth example of a conventionally known self-aligning roller bearing with retainer. In the case of the construction of the fourth example, a floating guide ring 16 is provided between the inner peripheral surface of the rim section 7 and the outer peripheral surface of an intermediate section of the inner ring 2, the outer peripheral surface of the floating guide ring 16 is made to closely oppose the inner peripheral surface of the rim section 7 and the inner peripheral surface of the floating guide ring 16 is made to closely oppose the outer peripheral surface of the intermediate section of the inner ring 2, to position the retainer 4c in the radial direction (by inner ring riding). Furthermore, flange shaped outward rib sections 10 are respectively formed on the outer peripheral surfaces of both end sections of the inner ring 2 so that the respective spherical rollers 3 do not disengage outwards in the axial direction from the space between the inner peripheral surface of the outer ring 1 and the outer peripheral surface of the inner ring 2.

In the cases of the first to fourth examples of the conventional construction, improvements in the following points are needed in order to achieve higher speed of the rotation shaft. First, in the cases of the first, second, and fourth examples shown in FIG. 17, FIG. 20, and FIG. 22, the rib sections 10 on the outer peripheral surfaces of both end sections of the inner ring 2, narrow the aperture area of the end section of the space between the inner peripheral surface of the outer ring 1 and the outer peripheral surface of the inner ring 2. Consequently, in the case where lubrication of the rolling contact portion between the rolling surfaces of the spherical rollers 3 and the outer raceway 5 and both inner raceways 6 is to be carried out by means of splash lubrication with oil-mist or oil-air, there is a disadvantage from the aspect of performing high speed operation, as the flow rate of the lubricant (lubrication oil) that enters into the above space is decreased. Furthermore, on assembling the respective spherical rollers 3 into the space, both of the rib sections 10 become an obstacle. Therefore, a notch for passing through the respective spherical rollers 3 needs to be formed in one portion of both of the rib sections 10, making processing of the inner ring 2 inconvenient, and the effect of preventing coming off becomes imperfect.

In the case of the third example of the conventional construction shown in FIG. 21, since the rib section is not present on the outer peripheral surface of both end sections of the inner ring 2a, the rib section does not narrow the aperture area of the end section of the space between the outer peripheral surface of the inner ring 2a and the inner peripheral surface of the outer ring 1. However, the connection section 11 provided for the retainer 4b narrows the aperture area of the end section of the space. Therefore, as is the case with the first, second, and fourth examples, the flow rate of lubricant (lubrication oil) that enters into the space decreases, resulting in a disadvantage for high speed operation.

Furthermore, in the case of the first and third examples of the conventional construction shown in FIG. 17 and FIG. 21, since the positions in the radial direction of the retainers 4a and 4b for holding both rows of spherical rollers 3 are determined according to the engagement of the outer peripheral surface of the rim section 7 with the inner peripheral surface of the outer ring 1, and in the case of the fourth example shown in FIG. 22, according to the engagement of the inner peripheral surface of the rim section 7 with the outer peripheral surface of the floating guide ring 16, there are disadvantages in achieving high speed operation of the rotation shaft due to the following points. Specifically, in the case of such construction, a relative speed (sliding velocity) between the outer peripheral surface and the inner peripheral surface of the outer ring 1, or between the inner peripheral surface of the rim section 7 and the outer peripheral surface of the floating guide ring 16 becomes greater, and friction at the engaging section between both these peripheral surfaces becomes greater as a result. This results in a greater amount of dynamic torque (rotational resistance) and heat being generated due to operation of the self-aligning roller bearing with retainer, which becomes a disadvantage in high speed operation.

Furthermore, there is a possibility of a greater amount of dynamic torque and heat being generated due to operation as a result of a difference in revolution speeds of both rows of spherical rollers 3. Specifically, when operating the self-aligning roller bearing with retainer, although in some cases the self-aligning roller bearing with retainer is operated in a state where both rows of spherical rollers 3 support the same amount of load when operating (under the same condition), in many cases the self-aligning roller bearing with retainer is operated in a state where the spherical rollers 3 in either one of the rows support a greater amount of load compared with the other row. As a result, the revolution speeds of both rows of spherical rollers 3 become different. In such cases, it is possible that the row of spherical rollers 3 with the higher revolution speed revolves while dragging the row of spherical rollers 3 with the lower revolution speed. Conversely, the row of spherical rollers 3 with the lower revolution speed brakes the revolution movement of the row of spherical rollers 3 with the higher revolution speed. In particular, this tendency becomes more significant in the case of operation while supporting an axial load. As a result, as described above, there is a possibility of a greater amount of dynamic torque and heat being generated due to operation.

Furthermore, also in the case of any one of the first to fourth examples of the conventional construction, the orientation of the spherical rollers 3 is not always stable in the pockets 9 of the retainers 4, and 4a to 4c. This is because the rolling surface of the spherical rollers 3 is a convex curved surface, whereas a sectional shape in the axial direction of the retainers 4 and 4a to 4c of the surface on both sides in the circumferential direction of the column sections 8a that constitute the surface on both sides in the circumferential direction of the pockets 9 is a straight line shape, parallel with this axial direction. Consequently, the outer peripheral surface, where the diameter is greatest, of the intermediate section in the axial direction of the spherical rollers 3 held in the respective pockets 9, makes contact with the surface on both sides in the circumferential direction of the column sections 8a, and a gap is formed between these surfaces on both sides in the circumferential direction and the portion close to both ends in the axial direction of the outer peripheral surface of the spherical rollers 3. Therefore, it becomes possible for these spherical rollers 3 to be displaced somewhat by oscillating centered around the contacting section of the intermediate section in the axial direction, to the extent of the above gap.

In the case where the spherical rollers 3 have been displaced by oscillating, so-called skewing occurs, in which the direction of the rotational axes of the spherical rollers 3 is at an inclined angle with respect to the direction orthogonal to the direction of revolution of these spherical rollers 3. When such skewing has occurred, significant sliding friction occurs at the rolling contact portion between the rolling surface of the spherical rollers 3 and the outer raceway 5 and the inner raceways 6. Consequently, not only does the resistance required for relative rotation between the outer ring 1 and the inner ring 2 (dynamic torque of the self-aligning roller bearing) become greater, but vibration generated in the respective rolling contact portions also becomes greater. Such increased dynamic torque and occurrence of vibration are not regarded as a significant problem when the operation speed of the self-aligning roller bearing is low. However, in order to increase this operation speed, it is necessary to stabilize the orientation of the spherical rollers 3 to suppress the occurrence of skewing in order to suppress dynamic torque and vibration.

Moreover, in the cases of the first, third, and fourth examples of the conventional construction shown in FIG. 17, FIG. 21, and FIG. 22, since the retainers 4, 4b, and 4c for holding both rows of spherical rollers 3 are positioned by inner ring riding or outer ring riding, a disadvantage in achieving high speed operation of the rotation shaft arises from the following points. Specifically, the relative speed (sliding velocity) between the inner peripheral surface of the rim section 7 and the outer peripheral surface of the inner ring 2 in the case of the fourth example of the conventional construction shown in FIG. 22, and the relative speed between the outer peripheral surface of the rim section 7 and the inner peripheral surface of the outer ring 1 in the case of the first and third examples of the conventional construction shown in FIG. 17 and FIG. 21, respectively become large in some cases. In this case, in the construction shown in FIG. 22, friction at the engaging section between the inner peripheral surface of the rim section 7 and the outer peripheral surface of the floating guide ring 16, and friction at the engaging section between the inner peripheral surface of the floating guide ring 16 and the outer peripheral surface of the inner ring 2 becomes greater, and in the construction shown in FIG. 17 and FIG. 21, friction at the engaging section between the outer peripheral surface of the rim section 7 and the inner peripheral surface of the outer ring 1 becomes greater. This results in a greater amount of dynamic torque (rotational resistance) and heat being generated due to operation of the self-aligning roller bearing with retainer, which becomes a disadvantage in high speed operation. Moreover, in the case of the construction shown in FIG. 22, the floating guide ring 16 is required to serve as an inner ring riding for the retainer 4, and the number of parts increases.

In order to solve the problems described above, controlling by so-called roller guiding is considered, by which the position in the radial direction of the retainer is controlled based on engagement between the inside surface of the pockets and the spherical rollers as shown in FIG. 20. However in the case of the self-aligning roller bearing with retainer, the retainer cannot be simply roller-guided for the following reason. For example, in the case of a general cylindrical roller bearing (cylindrical roller is not inclined with respect to the radial direction of the retainer), the rolling surface of the respective cylindrical rollers is the only part that engages with the inside surface of the respective pockets of the retainer as a result of displacement of the retainer in the radial direction. Therefore, in order to control the radial direction position of this retainer, it is sufficient to manage the clearance between the inside surface of the respective pockets and the rolling surface of the respective cylindrical rollers.

By contrast, in the self-aligning roller bearing with retainer, as shown in FIG. 17, FIG. 21, and FIG. 22, both rows of spherical rollers 3 held by the retainers 4, 4b, and 4c are arranged on an incline with respect to the radial direction of these retainers 4, 4b, and 4c. Therefore, in the case where these retainers 4, 4b, and 4c are displaced in the radial direction, the inside surface of the pockets 9 of these retainers 4, 4b, and 4c makes contact with either one of the rolling surface of the spherical rollers 3 or the end surface of the spherical rollers 3.

Moreover, in the case where the retainer is roller-guided, so-called skewing, in which the direction of the rotational axes of the respective spherical rollers is at an inclined angle with respect to the direction orthogonal to the direction of revolution of these spherical rollers, needs to be suppressed by the retainer. For example, in the case of the fourth example of the conventional construction shown in FIG. 22, the occurrence of skewing of the spherical rollers 3 is suppressed by the floating guide ring 16 and the rib section 10. Therefore, in this construction, in the case where the retainer is roller-guided and the floating guide ring 16 is omitted, skewing in the respective spherical rollers 3 needs to be suppressed by the rib section 10 and the retainer. Furthermore, as is the case with the third example of the conventional construction shown in FIG. 21, in the case of a construction where the rib section 10 is not formed, skewing of the spherical rollers 3 needs to be suppressed by the retainer only. Moreover, movement of the spherical rollers in the non-loaded zone, which is positioned on the side opposite to that where a load is applied to the self-aligning roller bearing with retainer, is controlled mainly by the retainer. Consequently, skewing may become more likely to occur to the spherical rollers in the non-loaded zone depending on the status of their engagement with the inside surface of the pocket of the retainer.

In the case where skewing of the spherical rollers 3 has occurred, a significant sliding friction occurs at the rolling contact portions between the rolling surfaces of the spherical rollers 3 and the outer raceway 5 and the inner raceways 6. Consequently, as the dynamic torque of the self-aligning roller bearing with retainer increases, the amount of heat generation increases, and furthermore, vibration occurring in the respective rolling contact portions becomes greater. An increase in such dynamic torque and heat generation and the occurrence of vibration is disadvantageous for increasing the operation speed of the self-aligning roller bearing with retainer.

Thus, in the case where the retainer of the self-aligning roller bearing with retainer is to be roller-guided, it is necessary to consider how to achieve positioning of the retainer in the radial direction (which of the inside surfaces of the respective pockets, and the rolling surface or the end surface of the spherical rollers are to be made to contact with each other) and furthermore, how to achieve suppression of skewing of the spherical rollers in the non-loaded zone. Therefore, the retainer that is assembled into the self-aligning roller bearing with retainer cannot be simply roller-guided.

Patent Document 1: Japanese Patent Application Publication No. H09-317760
Patent Document 2: Japanese Utility Model Registration No. 2524932

DISCLOSURE OF THE INVENTION

Problems to be Solved by the Invention

In consideration of the situation described above, an object of the present invention is to solve at least one of the following problems described in (1) to (3).

(1) To realize a self-aligning roller bearing with retainer that enables easier processing of respective constituent members and suppresses an increase in cost, while widening the area of an end section aperture of a space in which spherical rollers are installed, thus enabling efficient feed of lubricant into this space.

(2) To realize a construction of a high-rotation-speed capable, self-aligning roller bearing with retainer that stabilizes the orientation of the respective spherical rollers to prevent these spherical rollers from skewing, and a manufacturing method for efficiently manufacturing a retainer to be assembled into this self-aligning roller bearing with retainer.

(3) To realize a construction that achieves positioning in the radial direction of the retainer by engaging the retainer with the spherical rollers (roller guiding), while successfully suppressing skewing of the spherical rollers in a non-loaded zone.

Furthermore, an object of the present invention is to solve at least one of the following problems described in (4) and (5) as needed.

(4) To realize a construction that is advantageous for carrying out high speed operation by suppressing dynamic torque and heat generation due to operation.

(5) To realize a construction and manufacturing method for preventing the concentration of stress on a continuous section of a rim section and column section that constitute the retainer, thus achieving an increase in durability of the retainer.

Means for Solving the Problems

A self-aligning roller bearing with retainer, which is the subject of the present invention, comprises an outer ring, an inner ring, a plurality of spherical rollers, and a retainer as is the case with a conventionally known self-aligning roller bearing with retainer.

The outer ring has a spherically concave surfaced outer raceway formed on an inner peripheral surface thereof.

Moreover, the inner ring has a pair of inner raceways formed so as to oppose the outer raceway on an outer peripheral surface thereof.

Furthermore, a plurality of the spherical rollers are provided so as to be freely rotatable, in two rows between the outer raceway and both inner raceways.

In the case of the self-aligning roller bearing with retainer that is the subject of the present invention, the retainer has a plurality of pockets for holding the spherical rollers so that they may rotate freely. Consequently for this purpose these retainers are provided with an annular rim section disposed between both rows of spherical rollers, and a plurality of column sections disposed in the axial direction of the outer ring and inner ring with their base end sections joined to a plurality of positions around the circumferential direction of the side surface in the axial direction of the run section, and their respective end sections not joined to another section, being free ends. The portions between the column sections that are co-adjacent to each other in the circumferential direction are made the aforementioned pockets.

In particular, in a first aspect of the self-aligning roller bearing with retainer of the present invention, the length of the column sections is greater than a half of the length in the axial direction of the spherical rollers.

Moreover, an end portion of the side surface in the circumferential direction of the respective column sections projects further in the circumferential direction than an intermediate portion thereof, and a distance between the side surfaces in the circumferential direction of the end sections of the column sections that are co-adjacent to each other in the circumferential direction is smaller than a maximum diameter of the spherical rollers.

Furthermore, in a second aspect of the self-aligning roller bearing with retainer of the present invention, the surfaces on both sides in the circumferential direction of the column sections are concave curved surfaces that oppose a rolling surface of the spherical rollers across a pocket clearance into which lubricant oil can be fed (thickness in the radial direction is, for example, approximately 0.1 mm to 0.5 mm, or is approximately 0.4% to 2% of the maximum diameter of the spherical rollers). When a sectional shape of this concave curved surface is expressed in terms of the axial direction and the radial direction of the retainer (rim section), a radius of curvature of the sectional shape in the axial direction is greater than or equal to the radius of curvature of the rolling surface of the spherical rollers in the axial direction. Moreover, the radius of curvature of the sectional shape in the radial direction is greater than the radius of curvature of the rolling surface about the circumferential direction by just the size of the pocket clearance (for example, by approximately 0.1 mm to 0.52 mm or 0.4% to 2% of the maximum diameter of the spherical rollers).

Furthermore, in a third aspect of the self-aligning roller bearing with retainer of the present invention, the retainer has the column sections at a plurality of positions around the circumferential direction, and has a plurality of pockets for holding the respective spherical rollers between the column sections that are co-adjacent to each other in the circumferential direction such that they can rotate freely.

Moreover, the position of the retainer in the radial direction is controlled by engagement of the inside surface of the pockets with the spherical rollers (roller guiding).

In particular, in this self-aligning roller bearing with retainer, a relationship between the inside surfaces of the pockets of the retainer and the rolling surface or the end surface of the spherical rollers in a state where a central axis of the retainer is matched to a central axis of the self-aligning roller bearing with retainer, is controlled as described below. Specifically, in the case where the spherical rollers are positioned in the middle in the circumferential direction between the column sections that are co-adjacent to each other in the circumferential direction (in a neutral position), a shortest distance in the radial direction of the retainer between the rolling surface of the spherical rollers and the side surfaces in the circumferential direction of the column sections is taken as $H_1$. Moreover, when the respective spherical rollers are maximally distant from the surface that opposes the end surfaces of the respective spherical rollers among the inside surfaces of the pockets, a shortest distance in the radial direction of the retainer from these opposing surfaces to the end surface is taken as $H_2$. In this case, $H_1 \geq H_2$ is satisfied.

Furthermore, the method of manufacturing the retainer of the self-aligning roller bearing of the present invention is a method of manufacturing a retainer that is to be assembled into the self-aligning roller bearing according to the second aspect of the present invention. That is to say, it is a method in which the surfaces on both sides in the circumferential direction of a plurality of plain column sections, the respective base end sections of which are connected to an annular rim section at a plurality of places around the circumferential direction of the side surface in the axial direction of the rim section, and the respective end sections of which are made to be free ends that are not connected to any other sections, with spaces between both side faces in the circumferential direction being made smaller than the outer diameter of the spherical rollers, are processed to be concave curved surfaces as described above. Therefore, a turning tool having a convex curved outer peripheral surface is inserted into the portion between plain column sections that are co-adjacent to each other in the circumferential direction. In the sectional shapes of this convex curved surface, the radius of curvature of the sectional shape about the axial direction is greater than or equal to the radius of curvature of the rolling surface of the spherical rollers about the axial direction. Moreover, the radius of curvature of the sectional shape about the circumferential direction is smaller than the radius of curvature of the rolling surface about the circumferential direction. With such a turning tool inserted into the portion between the plain column sections co-adjacent in the circumferential direction with the central axis of the turning tool parallel with the central axis of the portion that is to be processed to become the pocket, the turning tool is rotated as it revolves around the central axis of the portion that is to become the pocket. Thus, the surfaces on both sides in the circumferential direction of the plain column sections are turned.

Moreover, when carrying out the second aspect of the present invention, preferably, the surfaces on both sides in the circumferential direction of the column sections and the surface on one side in the axial direction of the rim section are made continuous at a corner section of each pocket, by a concave curved surface having a sectional arc shape of a radius of curvature greater than or equal to 1 mm.

When manufacturing a retainer having such a concave curved surface, by turning the continuous portion of the surfaces on both sides in the circumferential direction of the column sections and the surface on one side in the axial direction of the rim section, with a convex curved surface portion having a sectional arc shape of a radius of curvature greater than or equal to 1 mm that is provided on the end section of the turning tool, a concave curved surface having a sectional arc shape of a radius of curvature greater than or equal to 1 mm is formed in this portion.

Moreover, in the case of carrying out the first and second aspects of the present invention described above, preferably, the position of the retainer in the radial direction is controlled based on engagement of the surfaces on both sides in the circumferential direction of the column sections, with the rolling surface of the spherical rollers (roller guiding).

Furthermore, in the case of carrying out the first to third aspects of the present invention, preferably, the retainer for holding the spherical rollers in one row, and the retainer for holding the spherical rollers in the other row are made independent from each other so as to be relatively rotatable. Alternatively, both these retainers are integrated, with the column sections provided on both sides in the axial direction of the rim section common to both the retainers.

Moreover, in the case of carrying out the second aspect of the present invention, preferably, the length of the column sections is made greater than a half of the axial length of the spherical rollers, as is the case with the first aspect of the present invention. Furthermore, the distance between the side surfaces in the circumferential direction of the end sections of the column sections that are co-adjacent to each other in the circumferential direction is made smaller than the maximum diameter of the spherical rollers.

Moreover, the third aspect of the present invention is preferably applied to a construction in which an internal clearance between the rollers and the column sections of the retainer is positive, and the downside of the self-aligning roller bearing with retainer becomes a loaded zone and the topside becomes a non-loaded zone when a downward load acts on the inner ring in operation due to the weight of a rotation shaft internally fitted and fixed to the inner ring.

Furthermore, when carrying out the first to third aspects of the present invention, preferably, there is not a rib section on the outer peripheral surface of both end sections of the inner ring.

Effect of the Invention

In a self-aligning roller bearing with retainer configured as described above, and a method of manufacturing the retainer for the self-aligning roller bearing, in the case of the self-aligning roller bearing with retainer according to the first aspect, the end sections of the column sections that are co-adjacent to each other in the circumferential direction, and that form the pockets, embrace respective spherical rollers and prevent disengagement of the spherical rollers from the pockets, in the axial direction of the outer ring and the inner ring. Therefore, it becomes unnecessary to form a rib section on an outer peripheral surface on both end sections in the axial direction of the inner ring, or to provide a connection section between the end sections of the column sections. As a result, an aperture area of the end section of the space between the inner peripheral surface of the outer ring and the outer peripheral surface of the inner ring can be made large. Moreover, this is advantageous from the aspect of high speed operation in the case where lubrication of rolling contact portions between rolling surfaces of the spherical rollers and the outer raceway and both inner raceways is to be carried out by means of splash lubrication, since the amount of lubrication (lubrication oil) that enters into the above space is increased. Furthermore, the rib sections do not have to be formed on both end sections in the axial direction of the outer peripheral surface of the inner ring. Hence the outer diameter of the inner ring can be made smallest at both end sections in the axial direction of the inner ring. Therefore the operation of assembling both retainers and the plurality of spherical rollers into the space between the outer peripheral surfaces of the inner ring and the inner peripheral surface of the outer ring, can be carried out easily. Furthermore, the processing operation of the inner ring becomes easier, thus keeping the cost of the self-aligning roller bearing with retainer including this inner ring low.

Moreover, in the case of the self-aligning roller bearing with retainer relating to the second aspect of the present invention, since the side surfaces in the circumferential direction of the column sections that divide both sides in the circumferential direction of the pockets are concave curved surfaces having a radius of curvature slightly greater than that of the rolling surface of the spherical rollers (by just the size of the pocket clearance), the orientation of the spherical rollers held in the pockets is stabilized. Therefore, significant skewing of the spherical rollers will not occur, and generation of significant sliding friction at the rolling contact portion between the rolling surfaces of the spherical rollers and the outer raceway and the inner raceways can be prevented. As a result, the resistance involved in the relative rotation between the outer ring and the inner ring, and vibration, that occur in operation, can be suppressed and high speed operation becomes possible.

Furthermore, according to the method of manufacturing a retainer for the self-aligning roller bearing of the present invention, the concave curved surface described above can be formed on the surfaces on both sides in the circumferential direction of the column sections with a high level of accuracy using an industrial technique that can be carried out at a comparatively low cost.

Moreover, in the case of the self-aligning roller bearing with retainer according to the third aspect of the present invention, when the retainer is displaced in the radial direction, the inside surface of the pockets of the retainer always makes contact with the end surface of the spherical rollers. Therefore, the radial direction position of the retainer is controlled by engagement of the inside surface of the pockets and the end surface of the spherical rollers. In the case of such an aspect of the invention, first, since the retainer is roller-guided, dynamic torque and heat generation due to operation of the self-aligning roller bearing with retainer can be reduced compared to the case of outer ring riding or inner ring riding. Furthermore, since there is no need for a floating guide ring, the number of parts is reduced.

Moreover, as described above, since the radial direction position of the retainer is controlled by engagement of the end surface of the spherical rollers and the inside surface of the pocket, even when the retainer has been displaced in the radial direction by its own weight, the distance from the end surface of the spherical rollers in the non-loaded zone to the inside surfaces of the retainer becomes shorter, and the occurrence of skewing in the spherical rollers in this non-loaded zone can be effectively suppressed. The reason that skewing can be suppressed by shortening the distance from the end surface of the spherical rollers to a surface opposing to this end surface in this way, is that the surface among the inside surfaces of the pockets that opposes the end surface is a plane surface (it does not have to be curved like the circumferential direction side surface of the column section). As long as the surface that contacts with the end surface of the spherical rollers is a plane surface, then, in the case where the spherical rollers are inclined such that skewing may occur and the end surface of the spherical rollers makes contact with the surface among the inside surfaces of the pocket that opposes to this end surface, it becomes easier to keep these spherical rollers from skewing further. Thus, if skewing is unlikely to occur to the spherical rollers, heat generation or vibration due to skew occurrence can be suppressed. As a result, a self-aligning roller bearing that is excellent at high speed can be achieved.

Furthermore, when a roller-guided configuration is employed, the friction speed of the engagement section for controlling the radial direction position of the retainer can be kept low, and dynamic torque and heat generation due to operation can be kept low.

Moreover, if the pair of retainers are made independent from each other, even in the case where a difference occurs in revolution speeds of both rows of spherical rollers, the retainers that hold the spherical rollers in both rows can be rotated independently. However, even when using the integrated type retainer, by appropriately setting the pocket clearance, the row of spherical rollers with the lower revolution speed can be prevented from braking the movement of the row of spherical rollers with the higher revolution speed, and dynamic torque and heat generation due to operation can be kept low.

Furthermore, in the second aspect of the present invention, when, as is the case with the first aspect of the present invention, the length of the column sections is made greater than a half of the length in the axial direction of the spherical rollers, and the distance between the side surfaces in the circumferential direction of the end sections of column sections that are co-adjacent to each other in the circumferential direction is made smaller than the maximum diameter of the spherical rollers, a similar operation and effect to that of the first aspect of the present invention can be achieved. That is to say, in addition to the operation and effect that can be achieved according to the second aspect of the present invention described above, the operation and effect that can be achieved according to the first aspect of the present invention can be achieved. Specifically, since there is no need to form a rib section on the outer peripheral surface of both end sections in the axial direction of the inner ring, or to provide a connection section between the end sections of the column sections in order to prevent disengagement of the spherical rollers from between the inner peripheral surface of the outer ring and the outer peripheral surface of the inner ring, the area of the aperture end section of the space between the inner peripheral surface of the outer ring and the outer peripheral surface of the inner ring can be widened. Then, the flow rate of lubricant that enters into this space is increased, which is advantageous for high speed operation. Moreover, there is no need to form the rib sections on the outer peripheral surface on both end sections in the axial direction of the inner ring, so that the operation of assembling the retainers and the plurality of spherical rollers into the space can be carried out easily. Furthermore, the processing operation of the inner ring becomes easier while keeping the cost of the self-aligning roller bearing with retainer including this inner ring low.

Moreover, if the rib sections are not present on the outer peripheral surface of both end sections of the inner ring, the aperture area of the end section of the space between the outer peripheral surface of the inner ring and the inner peripheral surface of the outer ring can be made wider, and lubricant can be easily taken into this space.

Furthermore, if the concave curved surface having a sectional arc shape is provided at the corner sections of the pockets, stress can be prevented from concentrating at the continuous section of the rim section and the column sections that constitute the retainer, and an increase in the durability of the retainer can be achieved.

Moreover, if the third aspect of the present invention is carried out with a loaded zone in the downside section and a non-loaded zone in the topside section and a positive internal clearance, in the case where the retainer has been displaced downward by its own weight in a construction in which the surface on one side in the axial direction of the rim section, which is arranged between the spherical rollers in both rows and which constitutes the retainer, opposes the end surface of the spherical rollers, the end surface of the spherical roller on the topside in the non-loaded zone makes contact with, or comes into close proximity to, the surface on one side in the axial direction of the rim section. Thus, skewing of the spherical roller present in this non-loaded zone can be effectively suppressed.

BEST MODE FOR CARRYING OUT THE INVENTION

First Example of the Embodiment

Figure 1:
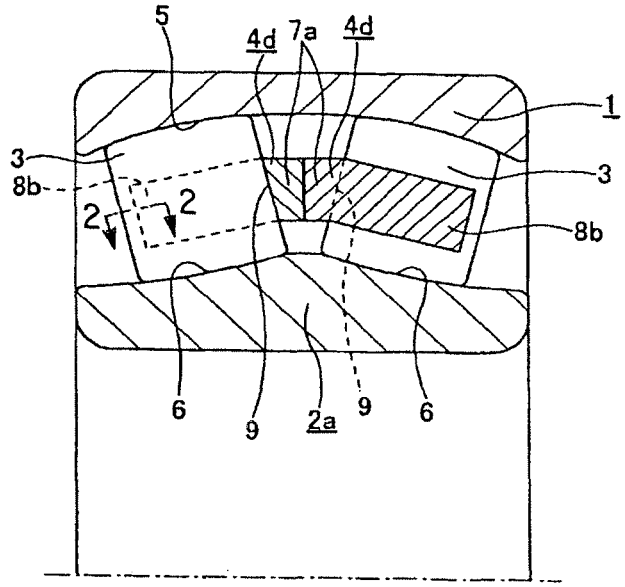
FIG. 1 is a half sectional view showing a first example of an embodiment of the present invention.
Figure 2:
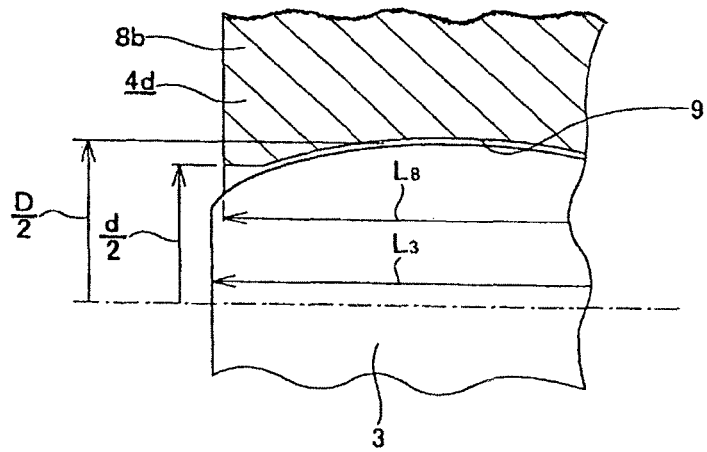
FIG. 2 is an enlarged sectional view of FIG. 1 along the line A-A.
Figure 20:
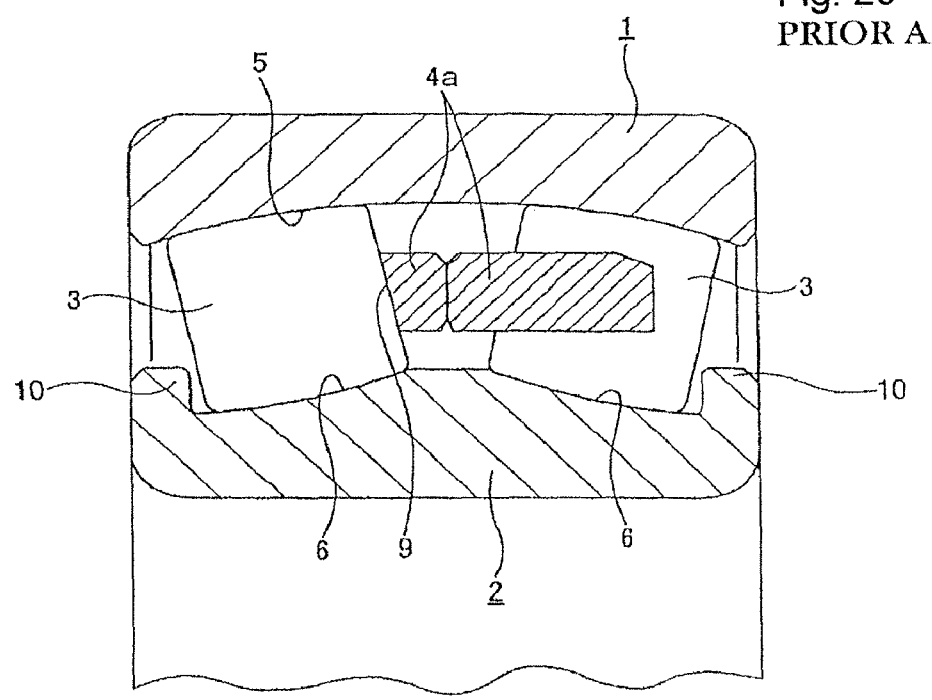
FIG. 20 is a partial sectional view showing a second example of the conventional construction.

FIG. 1 to FIG. 2 show a first example of an embodiment of the present invention corresponding to a first aspect. A self-aligning roller bearing with a retainer of the present example comprises an outer ring 1, an inner ring 2a, a plurality of spherical rollers 3, and a pair of mutually independent (assembled rotatably with respect to one another) retainers 4d similar to the aforementioned second example of the conventional construction shown in FIG. 20.

The outer ring 1 has an inner peripheral surface upon which is formed a concave spherical outer raceway 5 having a single center.

Moreover, on an outer peripheral surface of the inner ring 2a a pair of inner raceways 6 are formed so as to oppose the above outer raceway 5. Unlike the case of the aforementioned second example of the conventional construction, there are no rib sections 10 (refer to FIG. 20) provided on both ends of the outer peripheral surface of this inner ring 2a. The inner ring 2a to be assembled in the present example has a shape similar to that in the aforementioned third example of the conventional construction shown in FIG. 21.

Moreover, a plurality of the above spherical rollers 3 are provided so as to be freely rotatable, in two rows between the outer raceway 5 and both inner raceways 6.

Furthermore, both of the retainers 4d each have a plurality of pockets 9 for holding the spherical rollers 3 so that they can rotate freely. Therefore, both of the retainers 4d each have annular shaped rim sections 7a disposed between both rows of spherical rollers 3, and a plurality of column sections 8b. Each of these column sections 8b is disposed in the axial direction of the outer ring 1 and the inner ring 2 in a state where the base end sections of the column sections 8b are respectively joined to a plurality of positions at even intervals around the circumferential direction of the side surfaces in the axial direction of the rim sections 7a. Moreover, an end section of each of the column sections 8b is a free end and is not joined with other sections. That is to say, the connection section 11 shown in the aforementioned third example of the conventional construction (refer to FIG. 21) is not provided on the end section of each of the column sections 8b. The section surrounded from three directions by the side surfaces in the circumferential direction of the column sections 8b adjacent in the circumferential direction, and by one side surface in the axial direction of the rim section 7a, forms each pocket 9.

In particular, in the case of both of the retainers 4d that constitute the present example, a length $L_8$ of each of the column sections 8b is greater than half of an axial direction length $L_3$ of each of the spherical rollers 3 ($L_8 > L_3/2$).

Moreover, the end portions of the circumferential direction side surfaces of each of the column sections 8b are more prominent in the circumferential direction than the middle portions (front-back direction in FIG. 1, top-bottom direction in FIG. 2). A distance d between the circumferential direction side surfaces of the end portions of the column sections 8b that are co-adjacent in the circumferential direction is shorter than a maximum diameter D of each of the spherical rollers 3 (d<D).

Furthermore, an anti-disengagement amount (D−d) in which the distance d between the circumferential direction side surfaces of the end portions of the column sections 8b that are co-adjacent in the circumferential direction is shorter than the maximum diameter D of each of the spherical rollers 3, is designed and determined according to the size of the self-aligning roller bearing with retainer, and the material of both retainers 4d. For example, in the case where the size of the self-aligning roller bearing with retainer is: inner diameter of about 40 mm to 60 mm and outer diameter of about 100 mm to 120 mm, and the material of the retainers is copper or a copper-based alloy, the above anti-disengagement amount is approximately 100 μm to 300 μm.

Figure 17:
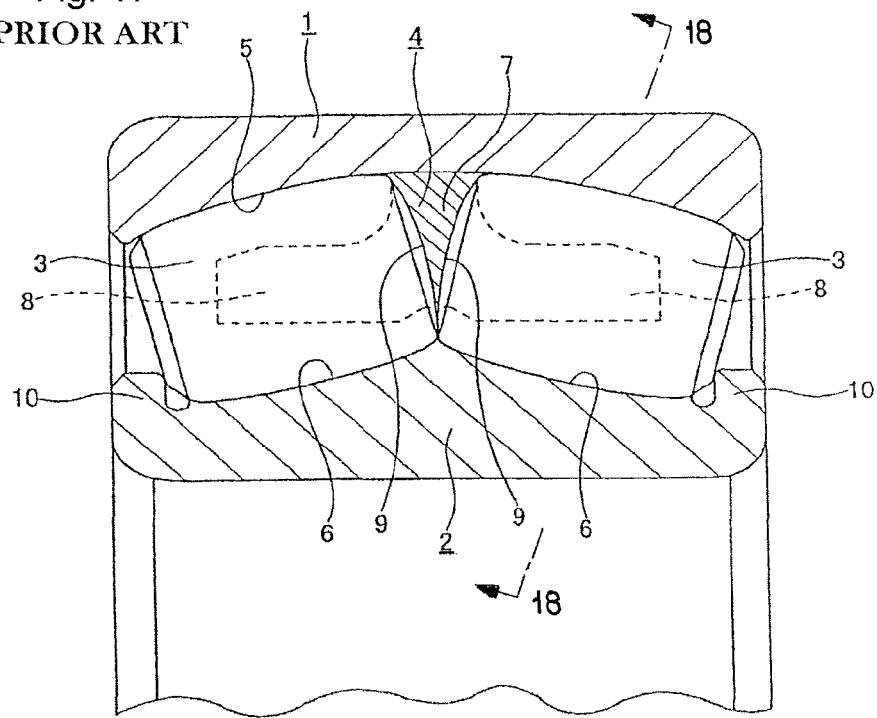
FIG. 17 is an enlarged sectional view of FIG. 16 along the line E-E.
Figure 18:
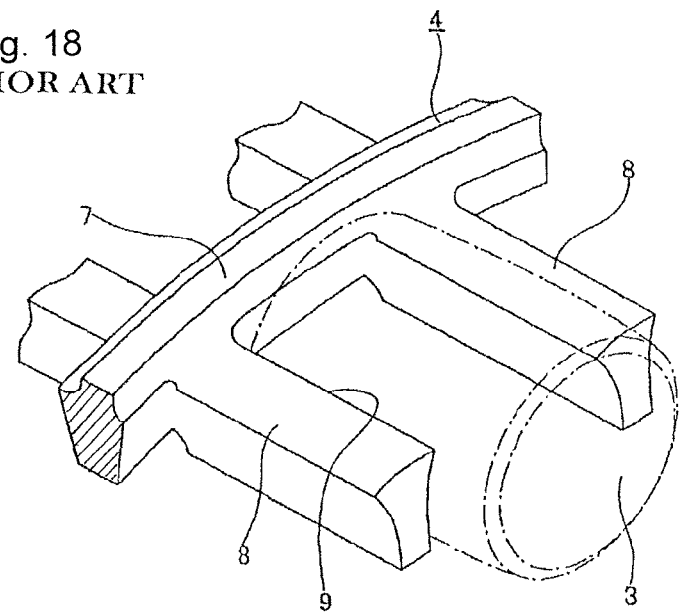
FIG. 18 is a partial perspective view showing a retainer which is assembled into the first example of the conventional construction having been taken out.
Figure 19:
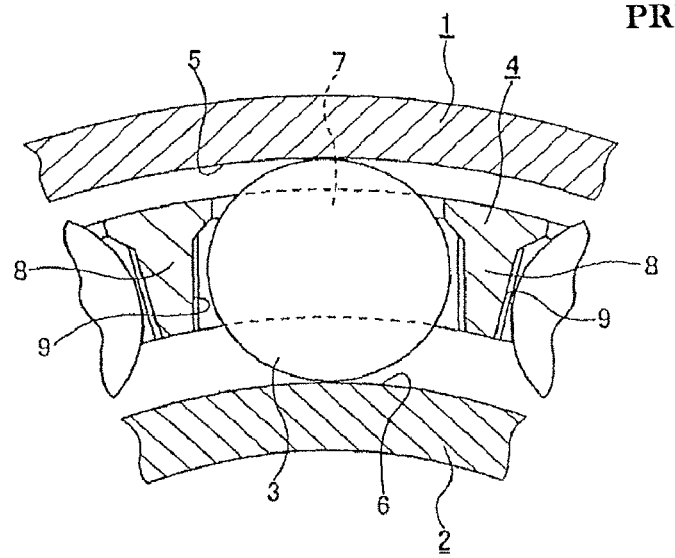
FIG. 19 is a sectional view of FIG. 17 along the line F-F.

In the case of the self-aligning roller bearing with retainer of the present example constructed as described above, the end portions of the column sections that are co-adjacent in the circumferential direction and constitute the pockets 9, embrace the spherical rollers 3, and prevent these spherical rollers 3 from disengaging from the pockets 9 in the axial direction of the outer ring 1 and the inner ring 2a. Therefore, it is not necessary to form rib sections 10 at both ends in the axial direction of the outer peripheral surface of the inner ring 2 as is the case with the first and second examples of the conventional construction shown in FIG. 17 and FIG. 20, or to provide a connection section 11 between the end sections of the column sections 8a as is the case with the third example of the conventional construction shown in FIG. 21. As a result, an aperture area of the end section of a space between the inner peripheral surface of the outer ring 1 and the outer peripheral surface of the inner ring 2a can be made large. Moreover, this is advantageous in the case where lubrication of rolling contact portions between rolling surfaces of the spherical rollers 3 and the outer raceway 5 and both inner raceways 6 is to be carried out by means of splash lubrication, since the amount of lubrication (lubrication oil) that enters into the above space is increased, allowing high speed operation.

Furthermore, the rib sections do not have to be formed on both end sections in the axial direction of the outer peripheral surfaces of the inner ring 2a, and hence the outer diameter of the inner ring 2a can be made smallest at both end sections in the axial direction of the inner ring 2a. Therefore the operation of assembling both retainers 4d and the plurality of spherical rollers 3 into the space between the outer peripheral surfaces of the inner ring 2a and the inner peripheral surface of the outer ring 1, can be carried out easily. Furthermore, the processing operation of the inner ring 2a becomes easier, thus keeping the cost of the self-aligning roller bearing with retainer including this inner ring 2a low.

Moreover, in the case of the present example, the radial direction positions of both retainers 4d are controlled by so-called roller guiding, which controls based on engagement between both of the circumferential direction side surfaces of the respective column sections 8b and the rolling surfaces of the respective rollers 3. That is to say, at least one part in a radial direction of both of the circumferential direction side surfaces of the column sections 8b is positioned so as to slide on or to closely oppose the rolling surfaces of the spherical rollers 3 to prevent the radial direction positions of both of the retainers 4d from being significantly displaced. Accordingly, the outer peripheral surfaces of the rim sections 7a are each sufficiently distanced from the inner peripheral surface of the outer ring 1, and the inner peripheral surfaces of the rim sections 7a are sufficiently distanced from the outer peripheral surfaces of the inner ring 2a. In the case of the present example, such a construction allows a friction speed of an engaging section for controlling the radial direction positions of both retainers 4d to be kept low, and dynamic torque and heat generation due to operation of the self-aligning roller bearing with retainer can also be kept low.

Moreover, in the case of the present example, as described above, since the retainer 4d for holding the spherical rollers 3 in one row, and the retainer 4d for holding the spherical rollers 3 in the other row are mutually independent allowing them to relatively rotate, even in the case where differences occur between revolution speeds of the spherical rollers 3 in both rows, both of the retainers 4d that hold both these rows of spherical rollers 3 rotate independently of one another. As a result, the spherical rollers 3 in a row with a faster revolution speed do not drag the spherical rollers 3 in the row with the slower revolution speed, and the spherical rollers 3 in the row with the slower revolution speed do not dampen the revolution action of the spherical rollers 3 in the row with the faster revolution speed. As a result, dynamic torque and heat generation due to operation of the self-aligning roller bearing with retainer can be kept low also. Moreover, it is possible for the construction of the present example to be carried out in combination with a second aspect and third aspect of the present invention.

Also, in the case of the present example, separated type retainers 4d are used, however, it is also possible to use an integrated type retainer. When using an integrated type retainer, in the case where a difference has occurred in the revolution speeds of the spherical rollers 3 in both rows, there is concern of the spherical rollers 3 in the faster revolution row and the spherical rollers 3 in the slower revolution row affecting the rotation of the retainer. However, such an influence caused by a difference in revolution speeds can be reduced by designing the pocket clearance within a range of 0.4% to 0.2% of the maximum diameter of the spherical rollers 3 so that it can absorb the difference in revolution speeds. That is to say, by controlling the pocket clearance to be an optimal value, the influence of a difference in the revolution speeds of the spherical rollers 3, on the rotation of the integrated type retainer can be reduced (to the degree where there is no problem in actual use).

Figure 3:
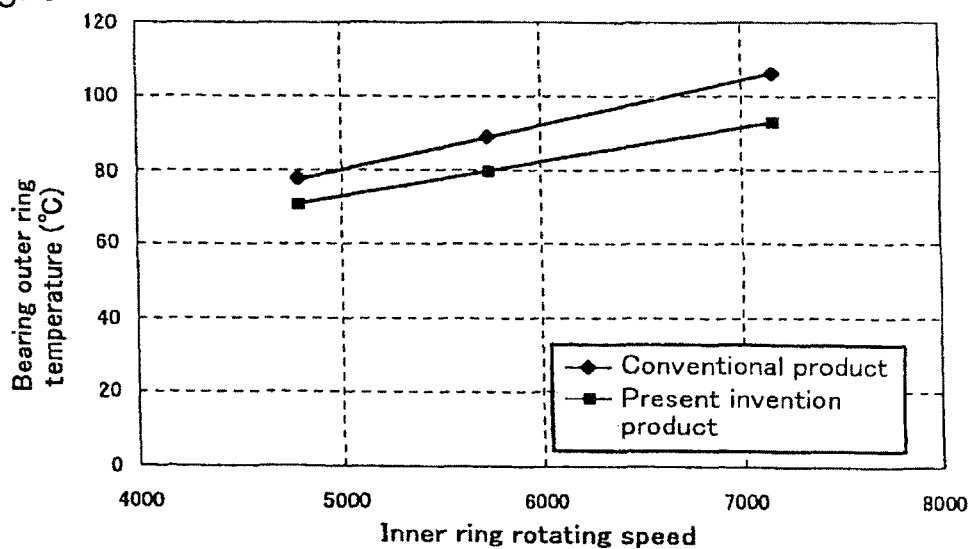
FIG. 3 is a graph showing the results of an experiment carried out to confirm an effect of the first example of the embodiment of the present invention.
Figure 4:
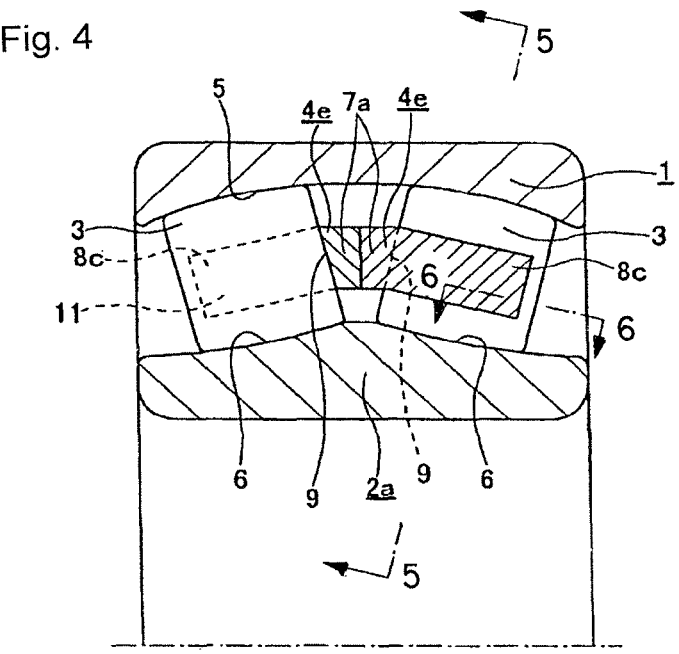
FIG. 4 is a half sectional view showing a second example of an embodiment of the present invention.
Figure 5:
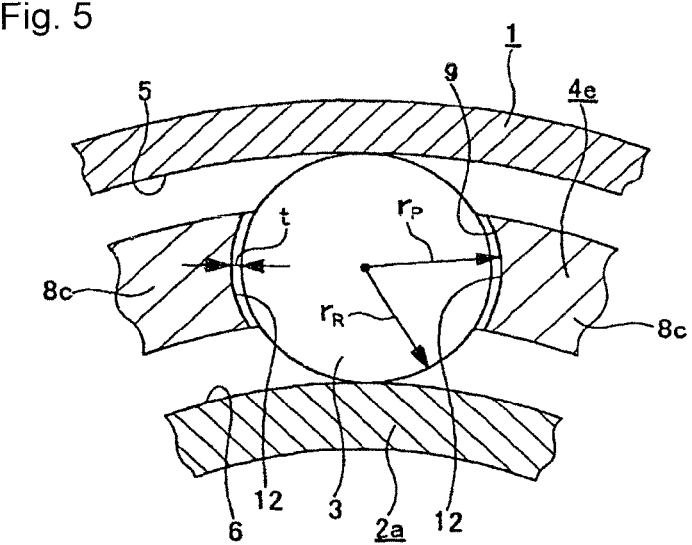
FIG. 5 is an enlarged sectional view of FIG. 4 along the line B-B.
Figure 6:
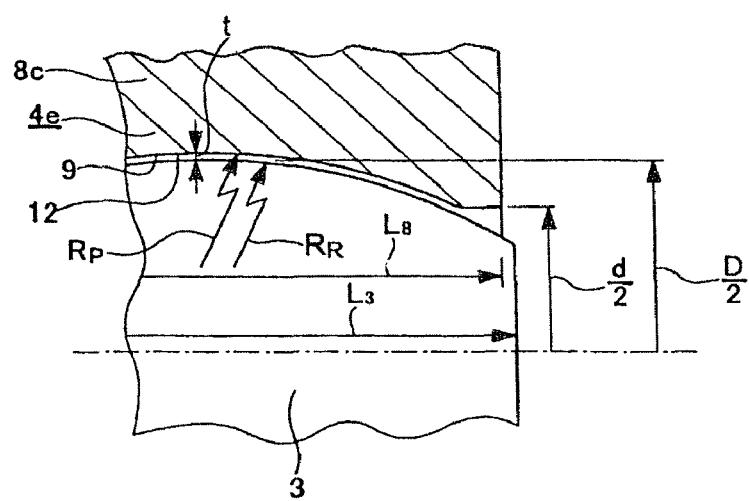
FIG. 6 is an enlarged sectional view of the same along the line C-C.

FIG. 3 shows the results of an experiment carried out for finding a difference in heat generation amount observed in operation of a self-aligning roller bearing with retainer constructed based on the first example of the conventional construction shown in FIG. 16 to FIG. 19, and a self-aligning roller bearing with retainer of the first example of an embodiment of the present invention having the construction described above. In the experiment, a self-aligning roller bearing with retainer of bearing number 22310 (outer diameter=110 mm, inner diameter=50 mm, width=40 mm) was used. Such a self-aligning roller bearing with retainer was subjected to a pure radial load of 9.8 kN (1,000 kgf), and operated under force feed lubrication with lubrication oil (VG68) (the inner ring was rotated). The operation speed was changed in three ways: 4800 min$^{-1}$, 5800 min$^{-1}$, and 7200 min$^{-1}$. Moreover, the permissible rotation speed (continuously operable rotation speed) of a self-aligning roller bearing with retainer of the above dimensions is 4800 min$^{-1}$.

The results of the experiment carried out under such conditions are shown in FIG. 3. As FIG. 3 clearly shows, an increase in temperature when operating the self-aligning roller bearing with retainer of the first example of the embodiment of the present invention can be kept lower than an increase in temperature observed with the conventional self-aligning roller bearing with retainer across all operation speed ranges. Moreover, as the operation speed increases (as operation conditions become more severe), the degree to which temperature increase is suppressed becomes more noticeable. It is clear from this result that the first aspect of the present invention is clearly effective in achieving faster operation of various kinds of mechanical apparatuses assembled with a self-aligning roller bearing with retainer.

Second Example of the Embodiment

FIG. 4 to FIG. 7 show a second example of the embodiment of the present invention that corresponds to the second aspect. A self-aligning roller bearing with a retainer of the present example comprises an outer ring 1, an inner ring 2a, a plurality of spherical rollers 3, and a pair of mutually independent (assembled rotatably with respect to one another) retainers 4e similar to the aforementioned second example of the conventional construction shown in FIG. 20.

The outer ring 1 has an inner peripheral surface upon which is formed a concave spherical outer raceway 5 having a single center.

Moreover, on an outer peripheral surface of the inner ring 2a a pair of inner raceways 6 are formed so as to oppose the outer raceway 5. Unlike the case of the aforementioned second example of the conventional construction, there are no rib sections 10 (refer to FIG. 20) provided on both ends of the outer peripheral surface of this inner ring 2a.

Furthermore, a plurality of the spherical rollers 3 are provided so as to be freely rotatable, in two rows between the outer raceway 5 and both inner raceways 6.

Moreover, both of the above retainers 4e are respectively manufactured integrally by carrying out turning or grinding processing on a material of a copper based alloy such as copper or brass, or an iron based alloy such as stainless steel, and they have a plurality of the pockets 9 for holding the respective spherical rollers 3 so that they can rotate freely. Therefore, both of the retainers 4e each have annular shaped rim sections 7a disposed between both rows of spherical rollers 3, and a plurality of column sections 8c. Each of these column sections 8c is disposed in the axial direction of the outer ring 1 and the inner ring 2 in a state where the base end sections of the column sections 8c are respectively joined (connected integrally) to a plurality of positions at even intervals around the circumferential direction of the side surfaces in the axial direction of the rim sections 7a. Moreover, an end portion of each of the column sections 8c is a free end and is not joined with other portion. That is to say, there is no connection section provided on the end portions of the column sections 8c to connect the end portions of the column sections 8c to one another. The section surrounded from three directions by the side surfaces in the circumferential direction of the column sections 8c adjacent in the circumferential direction, and by one side surface in the axial direction of the rim section 7a, forms each pocket 9.

In particular, in the case of both of the retainers 4e that constitute the present example, both of the circumferential direction side surfaces of the respective column sections 8c that divide both sides in the circumferential direction of the pockets 9 are concave curved surface sections 12 that are similar to, and a convex-concave reverse of, the rolling surfaces of the spherical rollers 3. Each of these concave curved surface sections 12 have radii of curvature $R_P$ and $r_P$ that differ from each other with respect to the axial and radial directions of the retainers 4e. The radii of curvature $R_P$ and $r_P$ in either direction are made greater than radii of curvature $R_R$ and $r_R$ of the rolling surfaces of the spherical rollers 3 to the extent that pocket clearances, into which lubrication oil can be fed, can be interposed between the rolling surfaces of the spherical rollers 3 held in the pockets 9, and the concave curved surface sections 12.

The thickness t in the radial direction (of each of the spherical rollers 3) of the pocket clearance (in the state where the central axis of the spherical rollers 3 and the central axis of the respective pockets 9 are aligned) differs to a degree depending on a specification (the size) of the self-aligning roller bearing. However, for example, in the case of a self-aligning roller bearing to be assembled into a rotation supporting section of a roller shaft or the like in various kinds of industrial mechanical apparatuses, it is approximately 0.1 mm to 0.5 mm, or it is 0.4% to 2% of the maximum diameter of each of the spherical rollers 3. The radii of curvature $R_P$ and $r_P$ in the respective directions of the concave curved surface sections 12 are made greater by the size of the above pocket clearance than the radii of curvature $R_R$ and $r_R$ in the corresponding directions of the rolling surfaces of the spherical rollers 3 ($R_P=R_R+t$, $r_P=r_R+t$). Moreover, since the axial direction radius of curvature $R_P$ is far greater than the radial direction radius of curvature $r_P$ ($R_P>>r_P$), even if $R_P=R_R$, substantially the same functionality can be attained. Therefore, the axial direction radius of curvature $R_P$ may be set between $R_P$ and $R_P+t$.

Figure 7:
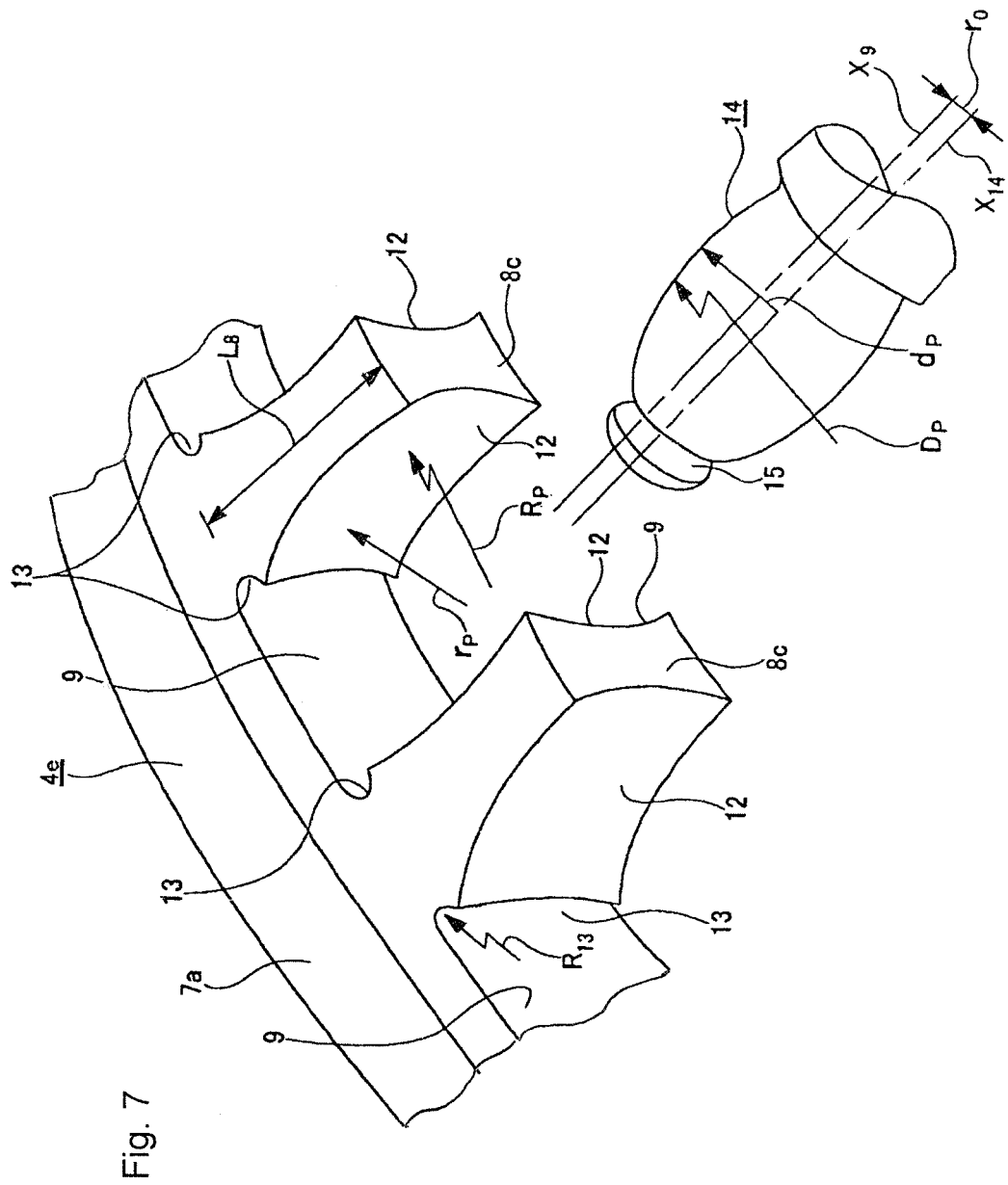
FIG. 7 is a perspective view that shows a retainer which is assembled into the second example of the embodiment having been taken out, together with a turning tool for processing surfaces on both sides in the circumferential direction of the column sections.

Furthermore, the concave curved surface sections 12 formed on both the side surfaces in the circumferential direction of the respective column sections 8c and the one side surface of the rim sections 7a in the axial direction are made continuous via undercut concave sections 13 for preventing interference with the end surface outer circumference edge portion of the spherical rollers 3 (refer to FIG. 7). In the case of the present example, each of these undercut concave sections 13 are concave curved surfaces with radii of curvature $R_{13}$ greater than or equal to 1 mm. Among both side end edges of the respective undercut concave sections 13, the end edge on the respective concave curved surface sections 12 side continues in a direction which is recessed in the circumferential direction of each of these concave curved surface sections 12 and the rim section 7a. On the other hand, the end edge on the surface side on one side in the axial direction of the rim section 7a is smoothly continuous with one side surface in the axial direction of this rim section 7a.

Furthermore, in the case of the present example, a length $L_8$ of each of the column sections 8c is greater than a half of an axial direction length $L_3$ of each of the spherical rollers 3 ($L_8>L_3/2$). Moreover a distance d between the circumferential direction side surfaces of the end sections of the column sections 8c that are co-adjacent in the circumferential direction is shorter than a maximum diameter D of each of the spherical rollers 3 (d<D). As described above, the difference (D−d: anti-disengagement amount) between the distance d between the side surfaces in the circumferential direction of the end sections of the column sections 8c that are co-adjacent to each other in the circumferential direction, and the maximum diameter D of the spherical rollers 3 is controlled to the degree such that the respective column sections 8c can be elastically deformed in the circumferential direction and the spherical rollers 3 pushed into the respective pockets 9. This degree is designed and determined according to the size of the self-aligning roller bearing with retainer, and the material and so forth of both retainers 4e. For example, in the case where the size of the self-aligning roller bearing with retainer is: inner diameter of about 40 mm to 60 mm and outer diameter of about 100 mm to 120 mm, and the material of the retainers is copper or a copper-based alloy, the above anti-disengagement amount is approximately 100 μm to 300 μm. These points are the same for the case of the aforementioned first example of the embodiment.

The shapes of both side surfaces in the circumferential direction of the respective column sections 8c described above are formed by turning or grinding both side surfaces in the circumferential direction of plain column sections formed to be wider than the respective column sections 8c with a rotary turning tool 14 as shown in FIG. 7. That is to say, in order to manufacture the retainer 4e having the respective column sections 8c, first an intermediate material having a volume greater than this retainer 4e is manufactured from an annular shaped material by means of turning processing.

This intermediate material comprises the annular shaped rim section 7a and the plurality of plain column sections, the respective base end sections of which are joined (made integrally continuous) in a plurality of circumferential direction positions on the axial direction side surface of the rim section 7a, and which have free-ended end portions that are not joined with other sections. The distance between both side surfaces in the circumferential direction of the respective plain column sections is made shorter than the outer diameter of the respective spherical rollers 3. Moreover, the shapes of both side surfaces in the circumferential direction of the respective plain column sections are not limited, provided that the distance between both these side surfaces in the circumferential direction meets the above condition (being shorter than the outer diameter of the respective spherical rollers 3). However, in the case where ease of intermediate material processing, and processing of the respective concave curved surface sections 12 with the turning tool 14 is to be considered, mutually parallel flat surfaces or a cylindrical shape concaved surface having a straight generatrix is preferable. Thus, in the case where both side surfaces in the circumferential direction of the respective plain column sections opposing each other are made mutually parallel flat surfaces or cylindrical shaped concaved surfaces, the distance between the flat surfaces or the inner diameter of the cylindrical shape concaved surface is less than or equal to the outer diameter of the end section in the axial direction of the rolling surface of the spherical rollers 3, and is greater than or equal to the portion of the turning tool 14 to be inserted between the plain column sections that are co-adjacent in the circumferential direction.

In order to process both side surfaces in the circumferential direction of the respective column sections described above into the respective concave curved surface sections 12, the turning tool 14 having a convex curved surface as an outer peripheral surface, is inserted between the plain column sections that are co-adjacent to each other in the circumferential direction. Among the sectional shapes of the convex curved surface of the outer peripheral surface of the turning tool 14, a radius of curvature $D_P$ of a sectional shape in the axial direction is equal to the radius of curvature $R_P$ in the axial direction of the respective concave curved surface sections 12, and it is greater than the radius of curvature $R_R$ in the axial direction of the rolling surface of the spherical rollers 3 by the thickness t of the pocket clearance ($D_P=R_P=R_R+t$). Conversely, among the sectional shapes of the convex curved surface of the outer peripheral surface of the turning tool 14, a radius of curvature $d_P$ of the sectional shape in the circumferential direction is smaller than a radius of curvature $r_P$ in the circumferential direction of the respective concave curved surface sections 12 by a revolution radius $r_O$, described later, of the turning tool 14 ($d_P=r_P-r_O=r_R+t-r_O$). Moreover, in the case of the example shown in the diagram, a convex curved surface portion 15 of a sectional arc shape with a radius of curvature of 1 mm or greater is formed on the outer peripheral surface of the end section of the turning tool 14.

In order to form the respective concave curved surface sections 12, the turning tool 14 described above is inserted between the plain column sections that are co-adjacent to each other in the circumferential direction such that a central axis $x_{14}$ of this turning tool 14 is placed parallel with a central axis $x_9$ of the portion that is to become the pocket 9 to be processed, until the top end surface of the turning tool 14 has made contact with the one side surface of the rim section 7a. Subsequently, the turning tool 14 is revolved around the central axis $x_{14}$ thereof in this state, and it is rotated around the central axis $x_9$ of the portion that is to become the above pocket, with the revolution radius $r_O$. However, this revolution radius $r_O$ is not to be set to this value initially, but to be gradually increased to this value. The outer peripheral surface of the turning tool 14 is made to contact with both side surfaces in the circumferential direction of the respective plain column sections from the portion having a greater outer diameter, and the sectional shape of the outer peripheral surface of the turning tool 14 in the axial direction is copied onto both side surfaces in the circumferential direction of the respective plain column sections.

As a result, the radius of curvature of the sectional shape in the axial direction of both side surfaces in the circumferential direction of the respective plain column sections becomes $R_P$ ($R_R$+t) as described above. On the other hand, the sectional shape, in the radial direction of the rim sections 7a, of both side surfaces in the circumferential direction of the respective plain column sections becomes $r_P$ ($=d_P+r=r_R+t$) where the revolution radius of the turning tool 14 becomes the value of $r_O$, as described above. In this state, the respective concave curved surface sections 12 that oppose the rolling surfaces of the respective spherical rollers 3 via the pocket clearances of thickness of t as describe above, are formed. Moreover, in this state, the undercut concave section 13 of radius of curvature of 1 mm or greater is formed by the convex curved surface section 15 in a continuous portion of both side surfaces in the circumferential direction of the base end section of the respective column sections 8c on which the respective concave curved surface sections 12 are respectively formed, and the one side surface in the axial direction of the rim section 7a.

In the case of the self-aligning roller bearing with retainer of the present example assembled with retainers 4 that are respectively manufactured as described above and have the construction described above, the posture of the respective spherical rollers 3 can be stabilized and skewing of these spherical rollers 3 can be prevented. As a result, vibration and heat generation caused by the skewing can be suppressed and high speed operation becomes possible. That is to say, since the respective concave curved surface sections 12 that constitute both side surfaces in the circumferential direction of the respective column sections 8c that in turn divide both sides in the circumferential direction of the respective pockets 9 are concave curved surfaces with slightly greater radii of curvature $R_P$ and $r_P$ than those of the rolling surfaces of the respective spherical rollers 3, the postures of the respective spherical rollers 3 held in the respective pockets 9 become stable. Therefore, significant skewing of the spherical rollers 3 will not occur, and generation of significant sliding friction at the rolling contact portion between the rolling surfaces of the spherical rollers 3 and the outer raceway 5 and both of the inner raceways 6 can be prevented. Consequently, resistance involved in the relative rotation between the outer ring 1 and the inner ring 2a, and vibration that occurs in operation can be suppressed and high speed operation becomes possible.

Furthermore, in the case of the present example, as with the aforementioned first example of the embodiment, the length $L_8$ of the respective column sections 8c is made greater than half of the length $L_3$ in the axial direction of the respective spherical rollers 3, and the distance d between the side surfaces in the circumferential direction of the end sections of the column sections 8c that are co-adjacent in the circumferential direction is made smaller than the maximum diameter D of the respective spherical rollers 3. Therefore the end portions of the respective column sections 8c that are co-adjacent in the circumferential direction and constitute respective pockets 9, embrace the respective spherical rollers 3, and prevent these respective spherical rollers 3 from disengaging from the respective pockets 9 in the axial direction of the outer ring 1 and the inner ring 2a. Therefore, it is not necessary to form the rib sections 10 on the outer peripheral surfaces of both end sections in the axial direction of the inner ring 2, as with the conventional construction shown in FIG. 17 and FIG. 20. As a result, an aperture area of the end section of a space between the inner peripheral surface of the outer ring 1 and the outer peripheral surface of the inner ring 2a can be made large. Moreover, this is advantageous in the case where lubrication of the rolling contact portions between the rolling surfaces of the spherical rollers 3 and the outer raceway 5 and both inner raceways 6 is to be carried out by means of splash lubrication, since the amount of lubrication (lubrication oil) that enters into the above space is increased, allowing high speed operation.

Furthermore, the rib sections do not have to be formed on both end sections in the axial direction of the outer peripheral surfaces of the inner ring 2a, and hence the outer diameter of the inner ring 2a can be made smallest at both end sections in the axial direction of the inner ring 2a. Therefore the operation of assembling both retainers 4e and the plurality of spherical rollers 3 into the space between the outer peripheral surfaces of the inner ring 2a and the inner peripheral surface of the outer ring 1, can be carried out easily. Furthermore, the processing operation of the inner ring 2a becomes easier, thus keeping the cost of the self-aligning roller bearing with retainer including the inner ring 2a low.

Moreover, in the case of the present example, the radial direction positions of both retainers 4e are controlled by so-called roller guiding, which controls based on engagement between both of the circumferential direction side surfaces of the respective column sections 8c and the rolling surfaces of the respective spherical rollers 3. That is to say, the centers of the curvature of the respective concave curved surface sections 12 that constitute both side surfaces in the circumferential direction of the respective column sections 8c are positioned between an inscribed circle and circumscribed circle of each of the column sections 8c (preferably, on a pitch circle of the respective spherical rollers 3, or in proximity to this pitch circle in the radial direction). Accordingly, the respective concave curved surface sections 12 are made to slide on or to closely oppose the rolling surfaces of the respective spherical rollers 3 to prevent the radial direction positions of both of the retainers 4e from being significantly displaced. Accordingly, the outer peripheral surface of the rim section 7a is sufficiently distanced from the inner peripheral surface of the outer ring 1, and the inner peripheral surface of the rim section 7a is sufficiently distanced from the outer peripheral surfaces of the inner ring 2a. In the case of the present example, such a construction allows the friction speed of an engaging section for controlling the radial direction positions of both retainers 4e to be kept low, and dynamic torque and heat generation due to operation of the self-aligning roller bearing with retainer can also be kept low.

Moreover, in the case of the present example, as described above, since the retainer 4e for holding the spherical rollers 3 in one row, and the retainer 4e for holding the spherical rollers 3 in the other row are mutually independent allowing them to relatively rotate, even in the case where differences occur between revolution speeds of the spherical rollers 3 in both rows, both of the retainers 4e that hold both these rows of spherical rollers 3 rotate independently of one another. As a result, the spherical rollers 3 in a row with a faster revolution speed do not drag the spherical rollers 3 in the row with the slower revolution speed, and the spherical rollers 3 in the row with the slower revolution speed do not dampen the revolution action of the spherical rollers 3 in the row with the faster revolution speed. As a result, dynamic torque and heat generation due to operation of the self-aligning roller bearing with retainer can be kept low also. Moreover, it is possible for the present example to be carried out in combination with the construction of the third aspect of the present invention.

Figure 8:
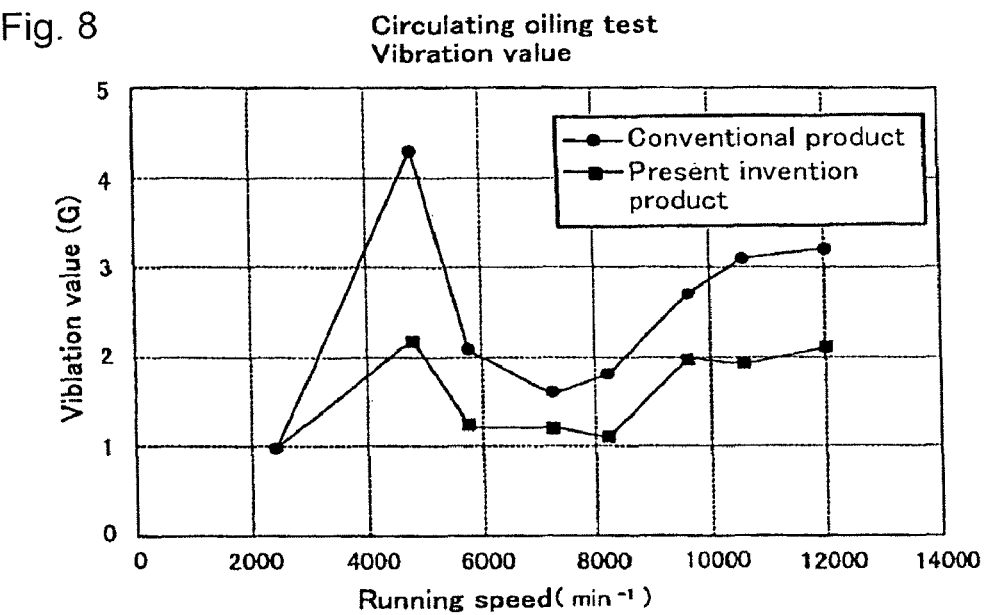
FIG. 8 is a graph showing the results of an experiment carried out to confirm an effect of the second example of the embodiment of the present invention.

FIG. 8 shows the results of an experiment carried out for finding a difference in vibration values observed in operation of a self-aligning roller bearing with retainer constructed based on the first example of the conventional construction shown in FIG. 16 to FIG. 19, and a self-aligning roller bearing with retainer of the second example of an embodiment of the present invention having the construction described above. In the experiment, a self-aligning roller bearing with retainer of bearing number 22310 (outer diameter=110 mm, inner diameter=50 mm, width=40 mm) was used. Such a self-aligning roller bearing with retainer was subjected to a combined radial load of 7.04 kN (718 kgf) and axial load of 5.35 kN (546 kgf), and operated under force feed lubrication with lubrication oil (VG68) (the inner ring was rotated). The operation speed was changed between 0 and 12000 min$^{-1}$, and vibration values were measured at eight points: 2000 min$^{-1}$, 4800 min$^{-1}$, 5600 min$^{-1}$, 7200 min$^{-1}$, 8200 min$^{-1}$, 9400 min$^{-1}$, 10500 min$^{-1}$ and 12000 min$^{-1}$. Moreover, the permissible rotation speed (continuously operable rotation speed) of a self-aligning roller bearing with retainer of the above dimensions is 4800 min$^{-1}$.

In the results of the experiment carried out under such conditions, as FIG. 8 clearly shows, vibration that occurs in operation of a self-aligning roller bearing with retainer of the present example can be kept low in all operation speed ranges compared to the case of a conventional self-aligning roller bearing with retainer. It is clear from these results that the second aspect of the present invention is clearly effective in achieving high speed operation of various kinds of mechanical apparatuses assembled with a self-aligning roller bearing with retainer. Furthermore, having disassembled the self-aligning roller bearing with retainer, and analyzed the wear status of the retainers after the experiment, the amount of wear of the retainer of the present example was approximately only one quarter of the amount of wear of the conventional retainer, thus confirming that wear of the retainers can be prevented according to the second aspect of the present invention.

Moreover, in order to confirm the effect of improving the strength of the retainer 4b by making the radii of curvature of the respective undercut concave sections 13 large (greater than or equal to 1 mm), a self-aligning roller bearing assembled with the retainers was subjected to a forced fall, and an evaluation carried out, to perform a drop impact test. The radius of curvature $R_{13}$ of each of the undercut concave sections 13 was 1.25 mm for the present invention, and it was 0.6 mm for a comparison example which deviates from the present invention. Moreover, the impact acceleration of a steel plate that was impacted against the self-aligning roller bearing, corresponding to the height from which the self-aligning roller bearing was to be dropped was 200 G. After every 500,000 impacts with this steel plate, the respective column sections that constitute the retainers were checked for the presence of damage such as breakage and cracking in the root portions. A total of four test samples: two test samples belonging to the present invention and two test samples belonging to the comparison example were respectively prepared. As a result of the drop impact test carried out as described above for the comparison example, some kinds of damage occurred in the root portion of the column sections of both samples within 500,000 times impacts. On the other hand, in the test samples belonging to the present invention, no damage occurred in the root portion of the respective column sections until the number of impacts reached 2,000,000 to 2,500,000 times. As a result of this experiment, it was confirmed that damage to the respective column sections can be prevented by making the radii of curvature of the respective undercut concave sections 13 large.

Third Example of the Embodiment

Figure 9:
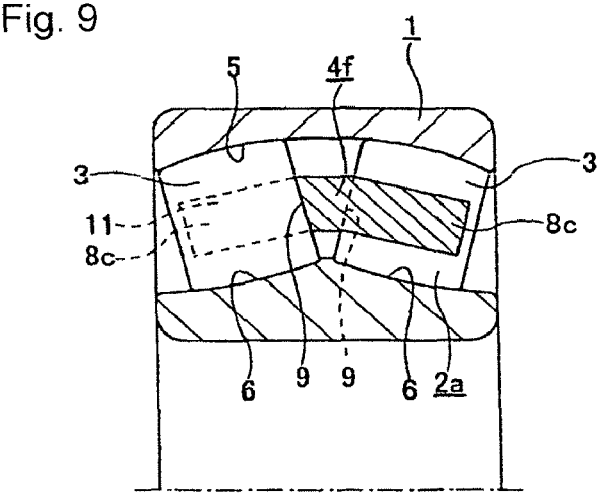
FIG. 9 is a half sectional view showing a third example of an embodiment of the present invention.

FIG. 9 shows a third example of the embodiment according to the second aspect of the present invention. In the case of the present example, an integrated type retainer is used as a retainer 4f for holding the spherical rollers 3 in both rows as with the case of the retainer 4 in the first example of the conventional construction shown in FIG. 17 and FIG. 18. Since such integrated type retainers 4f are used in the case of the present example, in the case where a difference occurs in the revolution speeds of the spherical rollers 3 in both rows, the possibility of the difference in the revolution speeds of the spherical rollers in the higher speed row and in the slower speed row influencing the rotation of the retainer 4f can be considered. However, even in the case where the integrated type retainer 4f is used and a difference occurs in the revolution speeds of the spherical rollers 3 in both rows, by designing the pocket clearances within 0.4% to 2% of the maximum diameter of the spherical rollers 3 to absorb the difference in revolution speed of the respective spherical rollers 3, the degree of the influence of the revolution speed difference on the rotation of the retainers 4f can be made smaller (to the degree where there is no problem in actual use). In the case of the first example of the embodiment and the second example of the embodiment described above, when a difference occurs in the revolution speeds of the spherical rollers 3 in both rows, the possibility of rubbing occurring between the rim sections 7a of both of the retainers 4d (4e) based on the revolution speed difference between the pair of the retainers 4d (4e), resulting in friction and wear occurring on the contact surfaces of both of the rim sections 7a can be considered. Therefore, whether to have a retainer of the integrated type, or a separated type which is made independent for each row, is appropriately selected according to the conditions of use of the self-aligning roller bearing with retainer. Other operations and effects are similar to the case of the second example of the embodiment described above.

Fourth Example of the Embodiment

Figure 10:
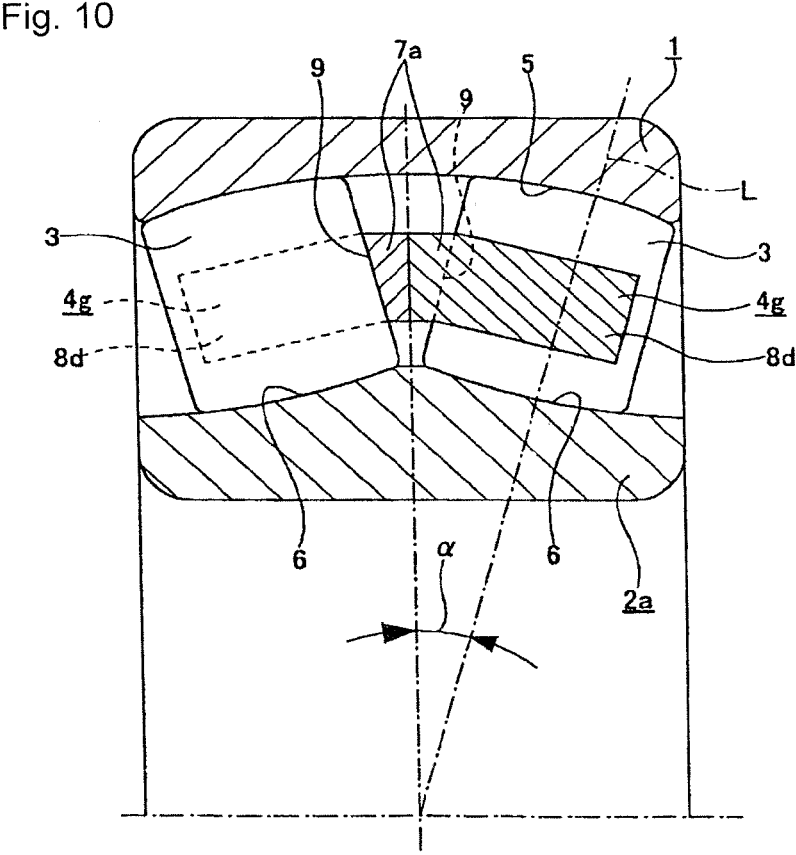
FIG. 10 is a half sectional view showing a fourth example of the same.
Figure 11:
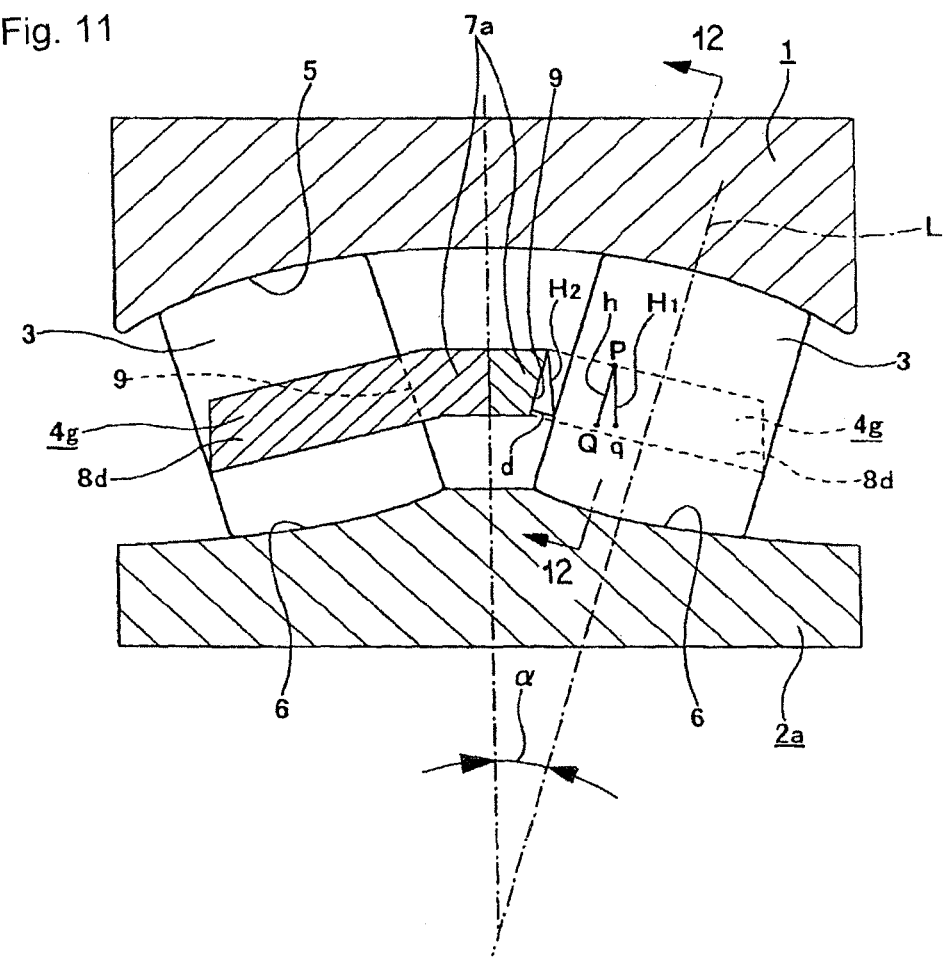
FIG. 11 is a schematic sectional view that shows a construction of the fourth example with a gap between a spherical roller and an inside surface of a pocket shown in exaggerated size.
Figure 12:
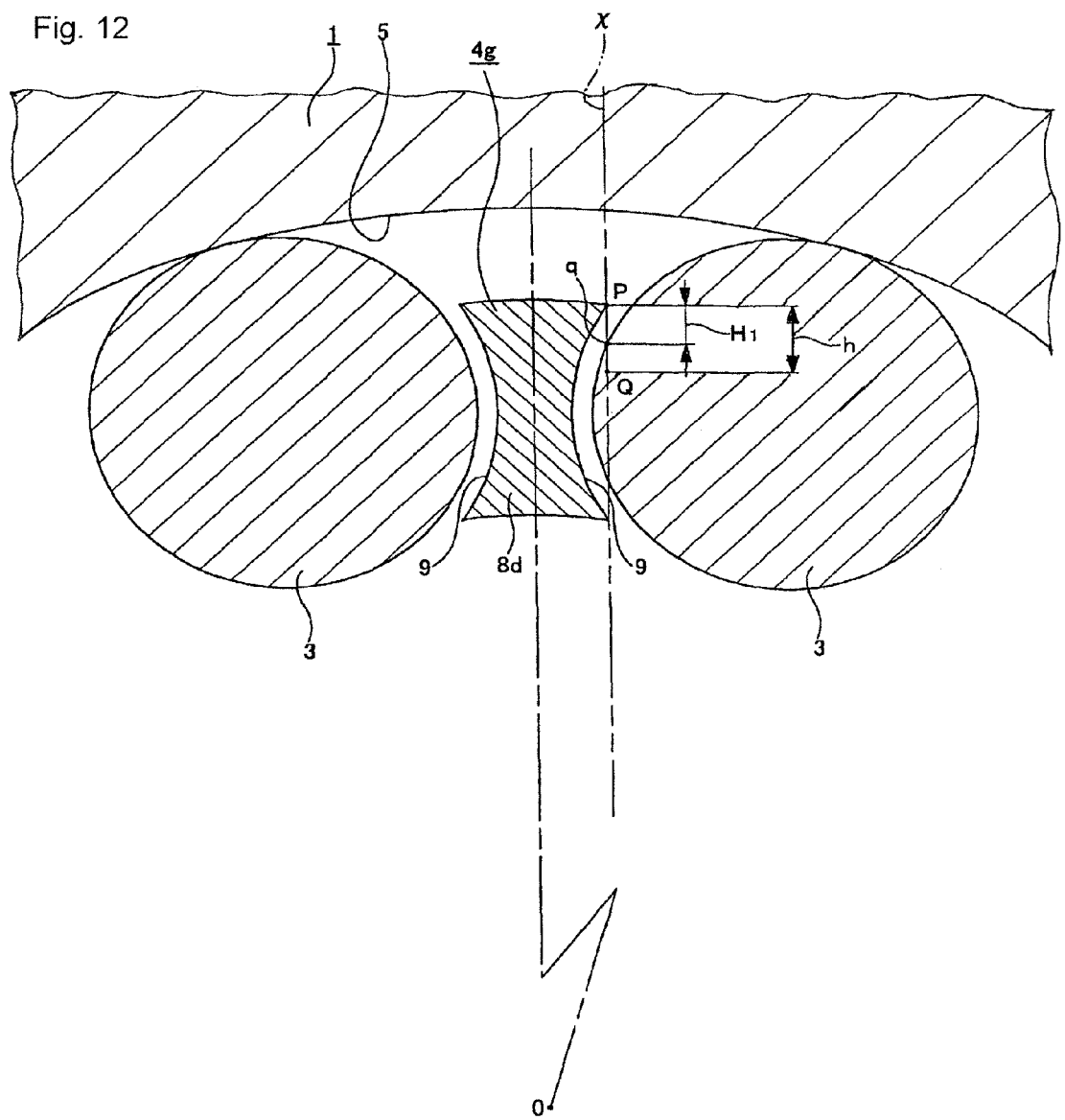
FIG. 12 is a sectional view of FIG. 11 along the line D-D.

FIG. 10 to FIG. 12 show a fourth example according to the third aspect of the present invention. The self-aligning roller bearing with retainer of the present example also comprises: an outer ring 1, an inner ring 2a, a plurality of the spherical rollers 3, and a pair of retainers 4g independent from each other (assembled rotatably with respect to one another). The outer ring 1 has an inner peripheral surface upon which is formed a concave spherical outer raceway 5 having a single center. Moreover, on an outer peripheral surface of the inner ring 2a a pair of inner raceways 6 are formed so as to oppose the outer raceway 5. Unlike the first, second, and fourth examples of the conventional construction shown in FIGS. 17, 20, and 22, the rib sections 10 are not provided on the outer peripheral surfaces of both end sections for this inner ring 2a. The inner ring 2a to be assembled in the present example has a shape similar to that in the aforementioned third example of the conventional construction shown in FIG. 21. Moreover, a plurality of the above respective spherical rollers 3 are provided so as to be freely rotatable, in two rows between the outer raceway 5 and both inner raceways 6. Furthermore, the self-aligning roller bearing with retainer of the present example has positive inner clearances, and, in use, a load acts on the inner ring 2a in the lower section in FIG. 10 to FIG. 12, due to the self weight of a rotating shaft that has been internally fitted to the inner ring 2a. Therefore, the lower section in FIG. 10 to FIG. 12 is a loaded zone; the upper section in FIG. 10 to FIG. 12 is a non-loaded zone.

Furthermore, both of the above retainers 4g respectively have a plurality of pockets 9 for holding the above respective spherical rollers 3 so that they may rotate freely. Therefore, both of the retainers 4g each have annular shaped rim sections 7a disposed between both rows of spherical rollers 3, and a plurality of column sections 8d. Each of these column sections 8d is disposed in the axial direction of the spherical rollers 3 in a state where base end sections of the column sections 8d are respectively joined to a plurality of positions at even intervals around the circumferential direction on a side surface in the axial direction of the rim sections 7a. Moreover, an end section of each of the column sections 8d is a free end and is not joined with other sections. That is to say, a connection section 11 shown in the third example of the above conventional construction (refer to FIG. 21) is not provided on the end section of each of the column sections 8d. The section surrounded from three directions by the side surfaces in the circumferential direction of the column sections 8d adjacent in the circumferential direction, and by one side surface in the axial direction of the rim section 7a, forms the each pocket 9. Furthermore, the radius of curvature of the generatrix shape of the circumferential direction side surface of the respective column sections 8d is slightly greater than the radius of curvature of the generatrix shape of the rolling surfaces of the respective spherical rollers 3. Moreover, the side surfaces in the axial direction of the rim sections 7a are formed in parallel with the end surfaces of the respective spherical rollers 3, and each of these surfaces is opposed to the other across a slight clearance.

In particular, in the case of the present example, the relationship between the inside surface of the pockets 9 and the rolling surfaces or end surfaces of the spherical rollers 3, in the state where the central axes of both retainers 4g are aligned with the central axis of the self-aligning roller bearing, is controlled as follows. First of all, when each of these spherical rollers 3 is positioned in the center (in the neutral position) between column sections 8d that are adjacent in the circumferential direction, the shortest distance between the rolling surfaces of the respective spherical rollers 3 and the side surface in the circumferential direction of the respective column sections 8d in the radial direction (top to bottom direction in FIG. 10 and FIG. 11) of both retainers 4g is $H_1$. Moreover, in the case where the spherical rollers 3 are maximally distant from one side surface in the axial direction of the rim sections 7a (positioned most outward in the axial direction of the respective spherical rollers 3), the shortest distance between the axial direction one side surface of the rim sections 7a and the end surface of the spherical rollers 3, in the radial direction of both of the retainers 4g is $H_2$.

Moreover, in FIG. 11 and FIG. 12, the distance $H_1$ shows the distance from the outer portion in the radial direction among the circumferential direction side surfaces of the respective column sections 8d to the rolling surfaces of the respective spherical rollers 3. However, if the distance from the inner portion in the radial direction among these circumferential direction side surfaces to the rolling surfaces of the respective spherical rollers 3 is shorter, then this distance is taken as $H_1$. In other words, $H_1$ denotes the distance from the side surfaces in the circumferential direction of the respective column sections 8d to the rolling surfaces of the respective spherical rollers 3, where the distance in the radial direction of both retainers 4g becomes shortest. On the other hand, for the distance $H_2$, since the end surfaces of the respective spherical rollers 3 are parallel with the one side surface in the axial direction of the rim sections 7a, the radial direction distance is not changed depending on the position in the radial direction.

In the case where each of the distances $H_1$ and $H_2$ are defined as described above, in the case where both of the retainers 4g respectively can move from the state of contacting the end surface or rolling surface of one of the spherical rollers 3 among the spherical rollers 3 symmetrically present about the central axis of both retainers 4g, to the state of contacting with the end surface or rolling surface of another spherical roller 3, the respective maximum moving distances are expressed as follows. That is to say, in the case where the spherical rollers 3 are in neutral positions in the circumferential direction, the distance in which both of the retainers 4g can move in the radial direction until the rolling surfaces of the respective symmetrically positioned spherical rollers 3 make contact with the side surfaces in the circumferential direction of the respective column sections 8d, is greatest. In this case, the moving distance of both of these retainers 4g in the radial direction is $2H_1$. Moreover, in the case where the spherical rollers 3 are in positions maximally distant from the one side surface in the axial direction of the rim sections 7a, the distance that both of the retainers 4g can move in the radial direction until the end surfaces of the respective symmetrical positioned spherical rollers 3 make contact with the one side surfaces in the axial direction of the rim sections 7a, becomes greatest. In this case, the distance that both of these retainers 4g can move in the radial direction is $2H_2$. In the case of the present example, $H_1$ and $H_2$ expressed as above are controlled to satisfy $H_1 \geq H_2$.

$H_2$ among the above $H_1$ and $H_2$ can be found from $H_2 = d/\sin\alpha$ where the size of the clearance in the axial direction of the respective spherical rollers 3 between the end surfaces of these spherical rollers 3 and the one side surface in the axial direction of the rim section 7a is taken as d and a contact angle of the self-aligning roller bearing with retainer is taken as $\alpha$, in the state where the respective spherical rollers 3 are maximally distant from the one side surface in the axial direction of the rim section 7a. Furthermore, the end surfaces of the respective spherical rollers 3 are parallel with the direction of the contact angle $\alpha$ (the direction parallel with a line of action L of the contact angle $\alpha$, that is, the down to left direction in FIG. 11, and the downward direction in FIG. 12). Therefore, the one side surface in the axial direction of the rim section 7a is parallel with the direction of the contact angle $\alpha$. Moreover, even with the above equation an accurate value for $H_2$ cannot be found in the case where conditions vary from those stated above, that is, in the case where the end surfaces of the respective spherical rollers 3 are not parallel with the direction of the contact angle $\alpha$. Therefore, in this case, $H_2$ is found for each specification of the self-aligning roller bearing with retainer.

Moreover, the above $H_1$ is also found in consideration of radii of curvature of the column sections 8d and the side surfaces in the circumferential direction of the spherical rollers 3. For example, $H_1$ can be found from the following approximation. First, in the case where the spherical rollers 3 are present in the neutral positions, the distance in the direction of the contact angle α between the side surfaces in the circumferential direction of the respective column sections 8*d* and the rolling surfaces of the respective spherical rollers 3 on an imaginary plane surface χ which includes a central axis O of the retainer 4*g* and lies parallel with the plane in the direction in which the retainer 4*g* moves in the radial direction (the top-bottom direction in FIG. 12), is taken as h. In this case, the distance $H_1$ between these respective surfaces in the radial direction of the retainer 4*g* is approximated by h/cos α ($H_1 \approx$ h/cos α). This point is described by the relationship between the spherical roller 3*s*, which are in the right side line in FIG. 11 and positioned on the right side in FIG. 12, and the side surface in the circumferential direction of the column section 8*d* opposing the rolling surface of these spherical rollers 3, with reference to FIG. 13. Moreover, the lengths of $H_1$ and h are respectively exaggeratedly shown in FIG. 11 and FIG. 12 for convenience of description. Consequently, in FIG. 11, the positional relationship between the respective points P, Q, and q, described later, appears to be further separated than is actually the case. Furthermore, in FIG. 12, since it is a sectional view of D-D in FIG. 11, h appears to be longer than $H_1$, however $H_1$ is actually longer than h.

Figure 13:
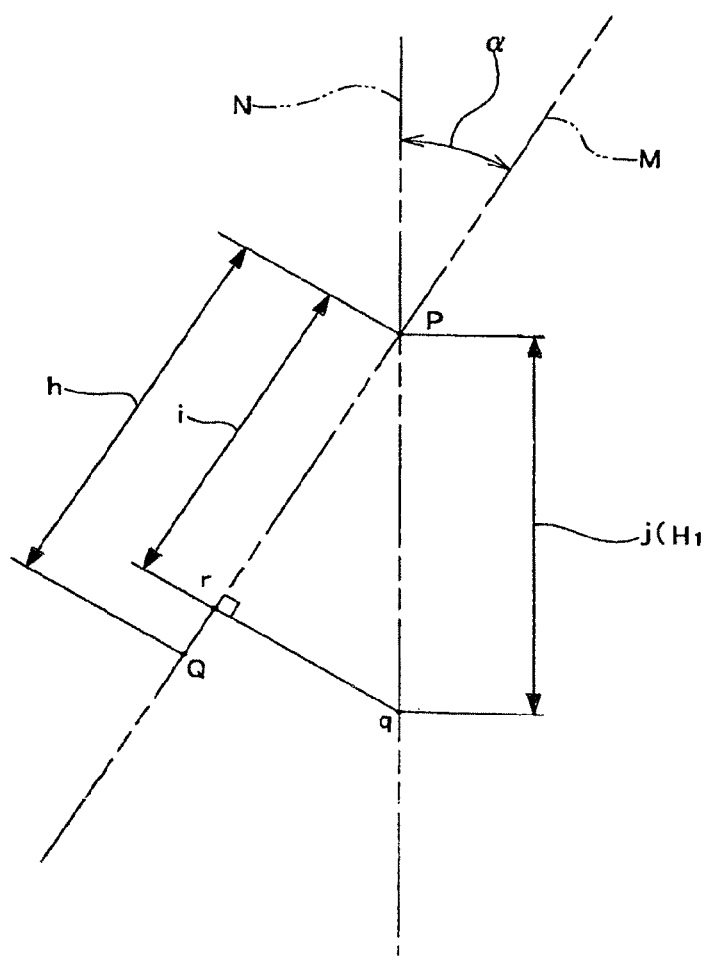
FIG. 13 is a diagram which schematically shows a positional relationship of respective points arranged on each of the side surface in the circumferential direction of the column section and a rolling surface of a spherical roller, in order to find a distance in the radial direction of the retainer between these surfaces.

FIG. 13 is a diagram seen from the same direction of FIG. 11, schematically showing the relationship between the respective distances $H_1$ and h. The respective points P, Q, and q shown in FIG. 11 and FIG. 13 are within an imaginary plane χ. Moreover, the point P among these points is on the side surface in the circumferential direction of the column section 8*d*, and it shows an arbitrary point on which it makes contact with the rolling surface of the spherical roller 3 in the case where the retainer 4*g* has moved in the radial direction and in the direction of the contact angle α. Furthermore, the point Q shows a point on which an imaginary line M, which passes through the above point P parallel with the direction of the contact angle α, intersects the rolling surface of the spherical roller 3. That is to say, it is a point on the rolling surface of the spherical roller 3 with which the above point P makes contact in the case where the retainer 4*g* has moved in the direction of the contact angle α. Furthermore, the point q shows a point on which an imaginary line N, which passes through the above point P parallel with the radial direction of the retainer 4*g*, intersects the rolling surface of the spherical roller 3. That is to say, it is a point on the rolling surface of the spherical roller 3 with which the above point P makes contact in the case where the retainer 4*g* has moved in the radial direction.

In the case where an intersecting point on the imaginary line M with a perpendicular line dropped from the point q among the points P, Q, and q is taken as r, and a distance from the intersecting point r to the point P in the direction of the contact angle α is taken as i, a distance j from the point P to the point q is expressed as i/cos α. This distance j corresponds to the distance $H_1$ in the radial direction, shown in FIG. 11 and FIG. 12 (j=$H_1$). Therefore, this distance $H_1$ is expressed as i/cos α. The radii of curvature are exaggeratedly shown in FIG. 11 to FIG. 13, however, the radii of curvature of the rolling surface of the spherical roller 3 and of the side surface in the circumferential direction of the column section 8*d* are actually greater than they appear to be in FIG. 11 to FIG. 13. As a result, the above distance i can be approximated to the distance from the point P to the point Q, that is, the distance h in the direction of the contact angle α (i≈h). From the above, the radial direction distance $H_1$ is approximated by h/cos α ($H_1 \approx$ h/cos α).

Furthermore, $H_1$ is expressed using h as described above because this h can be found comparatively more easily than finding $H_1$ directly from the size of the clearance between the side surface of the column section 8*d* and the rolling surface of the spherical roller 3 (from the difference between the radii of curvature of both of the surfaces). Moreover, the approximate expression described above is an example of an expression for finding $H_1$, and it can be applied to the case where the condition described above is satisfied (or there is a condition similar to this condition). Therefore, the above approximate expression may not be applicable in some cases depending on the condition. As a result, $H_1$ is determined by design for each specification of the self-aligning roller bearing with retainer.

In the case of the self-aligning roller bearing with retainer of the present example constructed as described above, the one side surface in the axial direction of the rim section 7*a* among the inside surfaces of the pockets 9 of both of the retainers 4*g* and the end surfaces of the respective spherical rollers 3 always make contact with each other when the retainer 4*g* is displaced in the radial direction. That is to say, as described above, the distance that both of the retainers 4*g* can move in the radial direction until the rolling surfaces of the respective symmetrical positioned spherical rollers 3 respectively make contact with the side surfaces in the circumferential direction of the respective column sections 8*d*, is $2H_1$. Moreover, the distance that the retainers can move in the radial direction until the end surfaces of the symmetrical positioned respective spherical rollers 3 respectively make contact with the one side surface in the axial direction of the rim section 7*a*, is $2H_2$. In the case of the present example, since $H_1 \geq H_2$, when both of the retainers 4*g* move in the radial direction and the inside surfaces of the respective pockets 9 make contact with the respective spherical rollers 3, at least the one side surface in the axial direction of the rim section 7*a* makes contact with the end surface of the spherical rollers 3. Therefore, the radial direction positions of both retainers 4*g* are controlled by the engagement of the one side surface in the axial direction of the rim section 7*a* and the end surfaces of the respective spherical rollers 3. In the case of this present example, first, since the retainers 4*g* is roller-guided, the amount of dynamic torque and heat generation due to operation of the self-aligning roller bearing with retainer can be reduced compared to the case of using the outer ring riding and inner ring riding seen in the conventional stricture shown in FIG. 21 and FIG. 22. Furthermore, since a floating guide ring is not required as in the conventional construction in FIG. 22, the number of parts is reduced.

Moreover, as described above, since the construction is such that the radial direction position of the retainers 4*g* is controlled by engagement of the end surfaces of the respective spherical rollers 3 with the one side surface in the axial direction of the rim section 7*a*, even in the case where both retainers 4*g* are displaced in the radial direction due to their own weight, by making the distance from the end surface of the spherical rollers 3 in a non-loaded zone to the one side surface in the axial direction of the rim section 7*a* short, occurrence of skewing in the spherical rollers 3 in these non-loaded zones can be effectively suppressed. That is to say, movement of the spherical rollers 3 in the non-loaded zone is controlled mainly by the retainers 4*g* (in the case of the self-aligning roller bearing with retainer having positive inner clearances, as is the case with the present example, movement of the spherical rollers 3 in the non-loaded zone is controlled substantially only by the retainers 4*g*). Specifically, the spherical rollers 3 in the non-loaded zone are pushed by the column sections of both retainers 4*g* so that they revolve. Conversely since the spherical rollers 3 in the loaded zone are restrained by the outer ring 1 and the inner ring 2*a*, they are revolved by the rolling contact of the rolling surfaces of these spherical rollers 3 and the outer raceway 5 and the inner raceways 6. Therefore, the influence of both retainers 4g exerted on the spherical rollers 3 in the non-loaded zone is greater than that on the spherical roller 3 present in the loaded zone, and skewing is more likely to occur.

Moreover, in the case of the present example, as described above, due to the weight of a rotating shaft fitted inside the inner ring 2a, the downside of the self-aligning roller bearing with retainer is the loaded zone and the topside is the non-loaded zone. Therefore, when both retainers 4g are displaced downward due to their own weight, the end surface of the spherical rollers 3 in the non-loaded zone and the one side surface in the axial direction of the rim section 7a come into close proximity of each other or make contact with each other before these spherical rollers 3 become likely to skew. As a result, in the case where the spherical rollers 3 in the non-loaded zone become likely to skew, the end surfaces of the spherical rollers 3 make contact with the rim section 7a before skewing becomes significant, and skewing can be effectively suppressed.

On the other hand, as a result of the downward displacement of both of the retainers 4g, the end surfaces of the spherical rollers 3 present in the loaded zone on the downside of the self-aligning roller bearing with retainer, separate from the one side surface in the axial direction of the rim section 7a. Consequently, the end surfaces of these spherical rollers 3 in the loaded zone are unlikely to make contact with the one side surface in the axial direction of the rim section 7a. In operation, these spherical rollers 3 in the loaded zone make rolling contact with the inside surfaces of the pocket 9 for holding the respective spherical rollers 3. Therefore, the fact that the end surfaces of the respective spherical rollers 3 are unlikely to make contact with the one side surface in the axial direction of the rim section 7a is preferable in terms of preventing wear of both these retainers 4g from rolling contact with the respective spherical rollers 3 by reducing the contact portion of both retainers 4g with the respective spherical rollers 3. Moreover, as described above, since the spherical rollers 3 in the loaded zone are unlikely to skew, the end surfaces of these spherical rollers 3 in the loaded zones do not have to be strongly made to contact with the one side surface in the axial direction of the rim section 7a in order to prevent the skewing.

Figure 21:
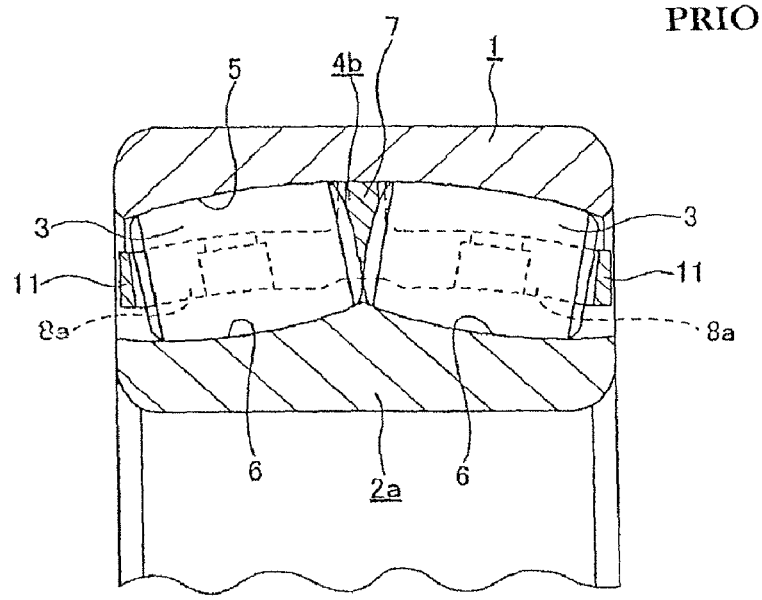
FIG. 21 is a partial sectional view showing a third example of the same.
Figure 22:
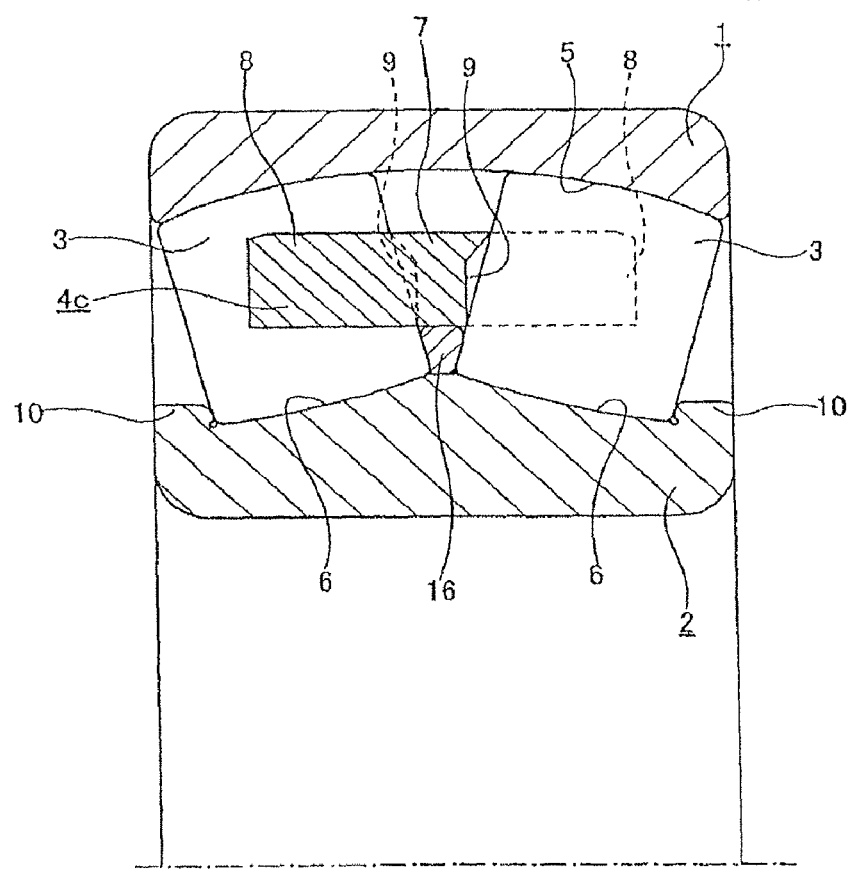
FIG. 22 is a partial sectional view showing a fourth example of the same.

Furthermore, in the case where a downward load is applied to the outer ring 1 so that the non-loaded zone of the self-aligning roller bearing with retainer comes to be on the downside, the end surfaces of the spherical rollers 3 in the non-loaded zone tend to separate from the one side surface in the axial direction of the rim section 7a. Therefore in this case, for example, as shown in FIG. 21, a connection section is provided on the end section of the retainer and the relationship between this connection section and the end surface of the spherical roller is controlled as described in the present embodiment. As a result of such a construction, when the retainer moves to the downside, the end surface of the spherical rollers in the non-loaded zone makes contact with the connection section, and the occurrence of skewing in these spherical rollers in the non-loaded zone can be effectively suppressed. Moreover, in the case of the present example, since roller guiding is employed, movement of the respective spherical rollers 3 is controlled to a certain degree within the pocket 9 due to the contact between the rolling surface of the respective rollers 3 and the column sections 8d. As a result, even if the end surfaces of the respective spherical rollers 3 are separate from the rim section 7a or the connection section, skewing is unlikely to occur. In any case, if skewing is unlikely to occur to the spherical rollers 3, heat generation or vibration due to skew occurrence can be suppressed. As a result, a self-aligning roller bearing that is excellent at high speed can be achieved.

Moreover, in the case of the present example, the end section of the column section 8d of both of the retainers 4g is a free end that does not connect with other sections. As a result, the area of the aperture end section of the space in which the respective spherical rollers 3 are, can be made large, and a flow rate of lubricant (lubrication oil) that enters into this space can be increased. That is to say, in the case of the third example of the conventional construction shown in FIG. 21, since the end sections of the respective column sections 8a are connected by the connection sections 11, the area of the aperture end section of the space becomes narrower and the flow rate of lubricant that enters into this space becomes smaller. On the other hand, this does not happen in the case of the present example. If the flow rate of lubricant can be increased, it is advantageous when operating at high speed.

Moreover, in the case of the present example, the retainer 4g for holding the spherical rollers 3 in one row and the retainer 4 for holding the spherical rollers 3 in the other row are mutually independent so that they can relatively rotate. As a result, even in the case where a difference occurs in the revolution speeds of the spherical rollers 3 in both rows, the retainers 4g holding the spherical rollers 3 in both rows independently rotate. That is to say, the self-aligning roller bearing with retainer is often operated with the spherical rollers 3 in one row bearing a greater load than the spherical rollers 3 in the other row. In this case, a difference occurs in the revolution speeds of the spherical rollers 3 in both rows. In the case of the present example, in such a case, since the retainers 4g for holding the spherical rollers 3 in both rows respectively independently rotate, the spherical rollers 3 in the row of faster revolution speed do not drag the spherical rollers 3 in the row of slower revolution speed, and neither do the spherical rollers 3 in the row of slower revolution speed slow down the spherical rollers 3 in the row of faster revolution speed. As a result, dynamic torque and heat generation caused by operation can be kept low. Moreover, it is possible for the present example to be carried out in combination with the construction of the first aspect and second aspect of the present invention.

Figure 14:
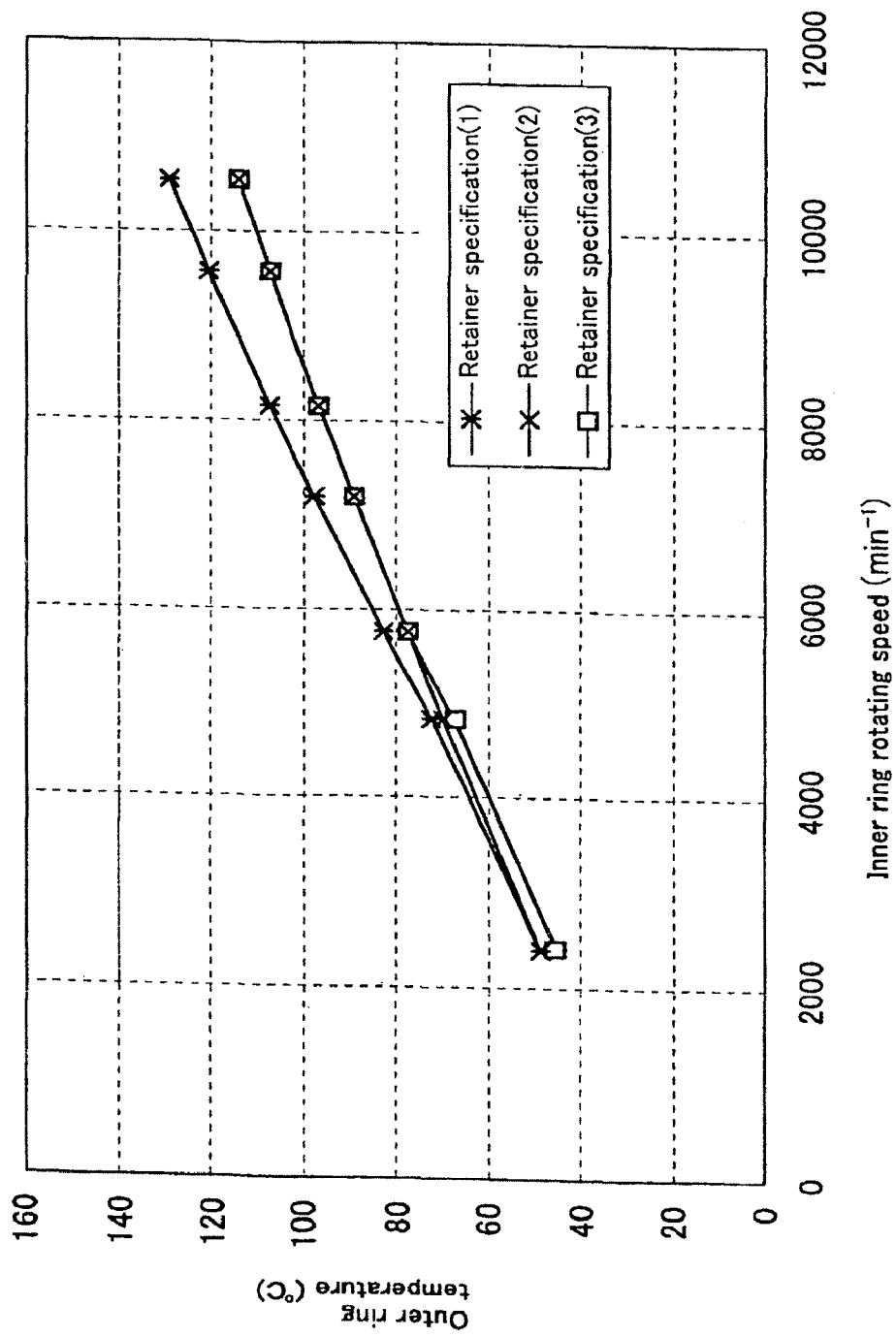
FIG. 14 is a graph showing the results of an experiment carried out to confirm an effect of the fourth example of the embodiment.

FIG. 14 shows the results of an experiment that the inventor has carried out to confirm the effect of the present embodiment. In the experiment, a self-aligning roller bearing of a bearing number 22310 (outer diameter=110 mm, inner diameter=50 mm, width=40 mm) was used. The clearance between the retainer and spherical rollers of the self-aligning roller bearing with retainer having such a specification was controlled, and the following three types of test samples shown in (1) to (3) were prepared. Furthermore, the distances denoted by $H_1$ and $H_2$ are as described in FIG. 11 to FIG. 13 mentioned above.

(1) $H_1$=0.24 mm, $H_2$=0.4 mm ($H_1$<$H_2$)
(2) $H_1$=0.4 mm, $H_2$=0.4 mm ($H_1$=$H_2$)
(3) $H_1$=0.4 mm, $H_2$=0.2 mm ($H_1$=2$H_2$, $H_1$>$H_2$)

In the experiment, the respective test samples as above were subjected to a radial load of 9.8 kN (1000 kgf), and operated (the inner ring was rotated) under force-feed lubrication with lubrication oil (VG68) at a flow rate of 0.5 L/min. The operation speed was changed as shown on the horizontal axis in FIG. 14. The temperature of the outer ring after a predetermined period of time had passed was measured for each rotational speed. Moreover, an permissible rotation speed (continuously operable rotation speed) of the self-aligning roller bearing with retainer having the above dimensions is 4800 min$^{-1}$.

As is clearly seen from FIG. 14 showing the results of the experiment carried out under such condition, the self-aligning roller bearings with retainer of (2) and (3) that satisfy the requirement of the present embodiment can suppress heat generation that occurs in the outer ring compared to the self-aligning roller bearing with retainer of (1), which is outside of the technical scope of the present invention. For example, in the case where the rotation speed is 4800 min$^{-1}$, heat generation can be reduced by approximately 2° C. to 3° C., and in the case where the rotation speed is 9600 min$^{-1}$ (twice the permissible rotation speed), heat generation can be reduced by approximately 13° C. Thus, it was confirmed that according to the construction of the present embodiment, a more significant effect of the present invention can be achieved at higher rotation speed.

Fifth Example of the Embodiment

Figure 15:
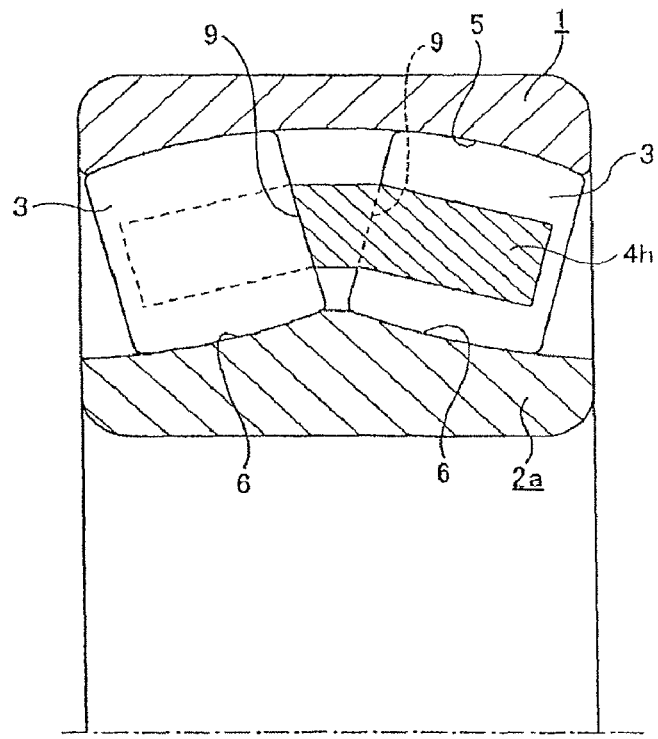
FIG. 15 is a half sectional view showing a fifth example of an embodiment of the present invention.
Figure 16:
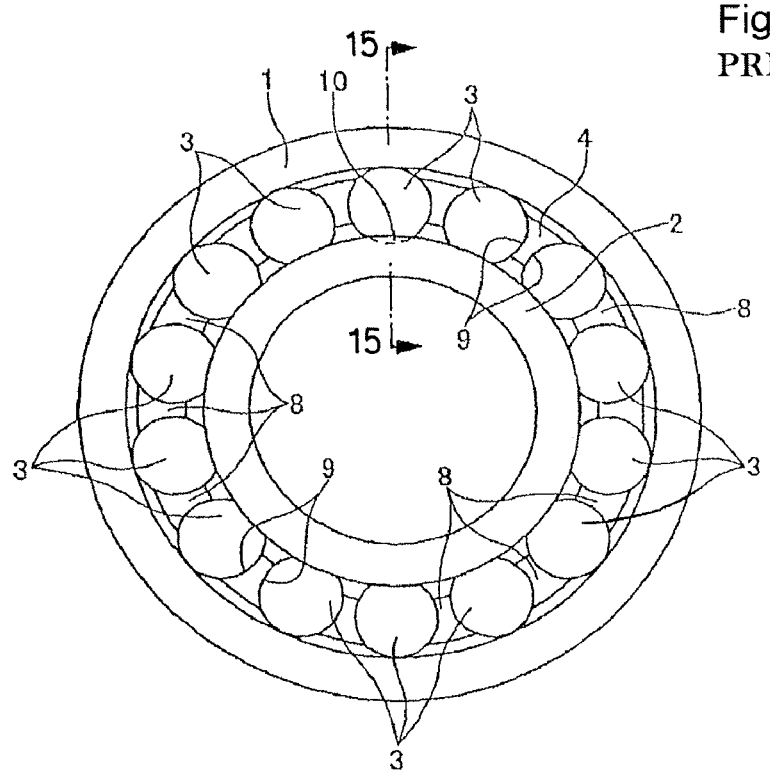
FIG. 16 is a front view showing a first example of a conventional construction.

FIG. 15 shows a fifth example of the embodiment of the present invention that corresponds to the third aspect. In the case of the present example, an integrated type retainer is used as a retainer 4h for holding the spherical rollers 3 in both rows, as is the case with the retainers 4, 4b, and 4c in the first, second, and fourth examples of the conventional construction shown in FIG. 17, FIG. 21, and FIG. 22. Since such an integrated type retainer 4h is used in the case of the present example, when a difference occurs in revolution speed of the spherical rollers 3 in both rows, there is a possibility that the difference in the revolution speeds of the spherical rollers in the higher speed row and in the slower speed row will influence the rotation of the retainer 4h. However, even in the case where the integrated type retainer 4h is used and a difference occurs in the revolution speeds of the spherical rollers 3 in both rows, by designing the pocket clearances within 0.4% to 2% of the maximum diameter of the spherical rollers 3 to absorb the difference in revolution speed of the spherical rollers 3 as described above, the degree of the influence of the revolution speed difference on the rotation of the retainer 4h can be made smaller (to the degree where there is no problem in actual use). Other operation and effects are similar to those of the case of the above described fourth example of the embodiment.

INDUSTRIAL APPLICABILITY

The present invention, in a self-aligning roller bearing with retainer that supports a rotation shaft inside a housing, and that is used assembled into a rotation supporting section of a roller shaft and so forth of various kinds of industrial mechanical apparatuses such as a paper manufacturing machine and a metal rolling mill, stabilizes the orientation of the spherical rollers, and prevents the spherical rollers from skewing, and enables rotation at high speed, and furthermore enables efficient lubricant feed into the pockets.

What is claimed is:

1. A self-aligning roller bearing with retainer comprising: an outer ring formed with a spherically concave surfaced outer raceway on an inner peripheral surface thereof; an inner ring formed with a pair of inner raceways so as to oppose the outer raceway on an outer peripheral surface thereof, a plurality of spherical rollers provided so as to be freely rotatable in two rows between the outer raceway and the inner raceways, and a retainer having column sections at a plurality of positions around the circumferential direction, and having a plurality of pockets for holding the respective spherical rollers between the column sections that are co-adjacent to each other in the circumferential direction such that they can rotate freely, and the position of the retainer in the radial direction is controlled by engagement of the inside surface of the pockets with the spherical rollers, wherein, in a state where a central axis of the retainer is matched to a central axis of the self-aligning roller bearing with retainer, in a case where the spherical rollers are positioned in the middle in the circumferential direction between the column sections that are co-adjacent to each other in the circumferential direction, if a shortest distance in the radial direction of the retainer between the rolling surface of the spherical rollers and the side surfaces in the circumferential direction of the column sections is taken as $H_1$, and in a case where the respective spherical rollers are maximally distant from the surface that opposes the end surfaces of the respective spherical rollers among the inside surfaces of the pockets, and if a shortest distance in the radial direction of the retainer from the opposing surfaces to the end surface is taken as $H_2$, then $H_1 \geqq H_2$ is satisfied.

2. A self-aligning roller bearing with retainer according to claim 1, wherein the retainer for holding the spherical rollers in one row, and the retainer for holding the spherical rollers in the other row are made independent from each other so as to be relatively rotatable.

3. A retainer for the self-aligning roller bearing with retainer according to claim 1, wherein an internal clearance between the rollers and the column sections of the retainer is positive, and when a downward load acts on the inner ring in operation, the downside becomes a loaded zone and the topside becomes a non-loaded zone.

4. A self-aligning roller bearing with retainer comprising: an outer ring formed with a spherically concave surfaced outer raceway on an inner peripheral surface thereof; an inner ring formed with a pair of inner raceways so as to oppose the outer raceway on an outer peripheral surface thereof, a plurality of spherical rollers provided so as to be freely rotatable in two rows between the outer raceway and the inner raceways, and a retainer having a plurality of pockets for holding the respective spherical rollers so that they may rotate freely, wherein the retainer is manufactured integrally by carrying out turning or grinding processing on a material of a copper based alloy or an iron based alloy and provided with an annular rim section disposed between the both rows of spherical rollers, and a plurality of column sections disposed in the axial direction of the outer ring and inner ring with their base end sections joined to a plurality of positions around the circumferential direction of the side surface in the axial direction of the rim section, and their respective end sections not joined to another section, being free ends, and portions between the column sections that are co-adjacent to each other in the circumferential direction are made the pockets, wherein a length of the column sections is greater than a half of the length in the axial direction of the spherical rollers, an end portion of the side surface in the circumferential direction of the respective column sections projects further in the circumferential direction than an intermediate portion thereof, and a distance between the side surfaces in the circumferential direction of the end sections of the column sections that are co-adjacent to each other in the circumferential direction is smaller than a maximum diameter of the spherical rollers wherein the position of the retainer in the radial direction is controlled based on engagement of the surfaces on both sides in the circumferential direction of the column sections, with the rolling surface of the spherical rollers.

5. A self-aligning roller bearing with retainer according to claim 4, wherein the retainer for holding the spherical rollers in one row, and the retainer for holding the spherical rollers in the other row are made independent from each other so as to be relatively rotatable.

6. A self-aligning roller bearing with retainer according to claim 4, wherein the retainer for holding the spherical rollers in one row, and the retainer for holding the spherical rollers in the other row are made independent from each other so as to be relatively rotatable.

7. A self-aligning roller bearing with retainer according to claim 4, wherein the retainer for holding the spherical rollers in one row, and the retainer for holding the spherical rollers in the other row are integrated with the column sections provided on both sides in the axial direction of the rim section.

8. A self-aligning roller bearing with retainer according to claim 4, wherein a rib section is not formed on the outer peripheral surface on both end sections of the inner ring.

9. A self-aligning roller bearing with retainer comprising:
an outer ring formed with a spherically concave surfaced outer raceway on an inner peripheral surface thereof; an inner ring formed with a pair of inner raceways so as to oppose the outer raceway on an outer peripheral surface thereof, a plurality of spherical rollers provided so as to be freely rotatable in two rows between the outer raceway and the inner raceways, and a retainer having a plurality of pockets for holding the respective spherical rollers so that they may rotate freely,
wherein the retainer is manufactured integrally by carrying out cutting or grinding processing on a material of a copper based alloy or an iron based alloy and provided with an annular rim section disposed between the both rows of spherical rollers, and a plurality of column sections disposed in the axial direction of the spherical rollers with their base end sections joined to a plurality of positions around the circumferential direction of the side surface in the axial direction of the rim section, and end sections not joined to another section, being free ends, and portions between the column sections that are co-adjacent to each other in the circumferential direction are made the pockets,
wherein surfaces on both sides in the circumferential direction of the respective column sections are concave curved surfaces that oppose a rolling surface of the spherical rollers across a pocket clearance into which lubricant oil can be fed, and in the case where a sectional shape of the concave curved surface is expressed in terms of the axial direction and the radial direction of the retainer, a radius of curvature of the sectional shape in the axial direction is greater than or equal to the radius of curvature of the rolling surface of the spherical rollers in the axial direction, and the radius of curvature of the sectional shape in the radial direction is greater than the radius of curvature of the rolling surface about the circumferential direction by just the size of the pocket clearance, and
wherein the surfaces on both sides in the circumferential direction of the column sections and the surface on one side in the axial direction of the rim section are made continuous at a corner section of each pocket, via undercut concave sections which respectively consist of a concave curved surface having a sectional arc shape of a radius of curvature greater than or equal to 1 mm,
wherein the position of the retainer in the radial direction is controlled based on engagement of the surfaces on both sides in the circumferential direction of the column sections, with the rolling surface of the spherical rollers.

10. A self-aligning roller bearing with retainer according to claim 9, wherein the retainer for holding the spherical rollers in one row, and the retainer for holding the spherical rollers in the other row are made independent from each other so as to be relatively rotatable.

11. A method of manufacturing a retainer that is to be assembled into the self-aligning roller bearing according to claim 9, comprising the acts of:
inserting between plain column sections that are co-adjacent to each other in the circumferential direction, of a plurality of plain column sections, the respective base end sections of which are connected to an annular rim section at a plurality of places around the circumferential direction of the side surface in the axial direction of the rim section, and the respective end sections of which are made to be free ends that are not connected to any other sections, with spaces between both side faces in the circumferential direction being made smaller than the outer diameter of the spherical rollers, a turning tool having a convex curved outer peripheral surface, and for which, in the sectional shapes of the convex curved surface, the radius of curvature of the sectional shape about the axial direction is greater than or equal to the radius of curvature of the rolling surface of the spherical rollers about the axial direction, and the radius of curvature of the sectional shape about the circumferential direction is smaller than the radius of curvature of the rolling surface about the circumferential direction; and
rotating the turning tool as it revolves around the central axis of the portion that is to become the pocket, and thus turning the surfaces on both sides in the circumferential direction of the plain column sections.

12. A method of manufacturing a retainer according to claim 11, that is to be assembled into the self-aligning roller bearing, wherein by turning the continuous portion of the surfaces on both sides in the circumferential direction of the column sections and the surface on one side in the axial direction of the rim section, with a convex curved surface portion having a sectional arc shape of a radius of curvature greater than or equal to 1 mm that is provided on the end section of the turning tool, a concave curved surface having a sectional arc shape of a radius of curvature greater than or equal to 1 mm is formed on the continuous portion.

* * * * *